(12) United States Patent
Less et al.

(10) Patent No.: US 10,926,194 B2
(45) Date of Patent: Feb. 23, 2021

(54) METHOD AND APPARATUS FOR PROMOTING DROPLETS COALESCENSE IN OIL CONTINUOUS EMULSIONS

(71) Applicant: Saudi Arabian Oil Company, Dhahran (SA)

(72) Inventors: Simone Less, Dhahran (SA); Sebastien A. Duval, Dhahran (SA); Abderrazak Traidia, Dhahran (SA); Regis D. Vilagines, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/707,434

(22) Filed: Dec. 9, 2019

(65) Prior Publication Data
US 2020/0139267 A1 May 7, 2020

Related U.S. Application Data

(62) Division of application No. 15/888,773, filed on Feb. 5, 2018, now Pat. No. 10,537,830.

(51) Int. Cl.
*B01D 17/06* (2006.01)
*B03C 11/00* (2006.01)
(Continued)

(52) U.S. Cl.
CPC ........... *B01D 17/06* (2013.01); *B01D 17/045* (2013.01); *B01D 17/12* (2013.01); *B03C 11/00* (2013.01);
(Continued)

(58) Field of Classification Search
CPC ................................ C10G 33/02; B01D 17/06
See application file for complete search history.

(56) References Cited

U.S. PATENT DOCUMENTS

| 987,115 A | 3/1911 | Cottrell et al. |
|---|---|---|
| 2,105,614 A | 1/1938 | Roberts |

(Continued)

FOREIGN PATENT DOCUMENTS

| CN | 102517070 A | 6/2012 |
|---|---|---|
| CN | 103446780 A | 12/2013 |
| GB | 1224950 | 3/1971 |

OTHER PUBLICATIONS

Ahmad, Zulkifli; "Polymeric Dielectric Materials" Intech Open Science, Chapter 1, 2012; pp. 3-26.
(Continued)

*Primary Examiner* — Brian W Cohen
*Assistant Examiner* — Ho-Sung Chung
(74) *Attorney, Agent, or Firm* — Bracewell LLP; Constance G. Rhebergen; Brian H. Tompkins

(57) ABSTRACT

Separation apparatuses for the separation of a mixture of two fluids, such as a water-in-oil emulsion, via electrocoalescence, are provided. A separation apparatus may include a series of flow conditioners each having a different permittivity, such that the flow conditioner having a permittivity that is similar or equal to the permittivity of the flowing medium is selected. Another separation apparatus may include a flow conditioner having a frequency-dependent permittivity, such that the frequency of the electric field generated is selected so that the permittivity of the flow conditioner is as similar as possible to or equal to the permittivity of the flowing medium. Another separation apparatus may include a replaceable flow conditioner that may be replaced with a flow conditioner having a permittivity that is as similar to or equal to the permittivity of the flowing medium.

4 Claims, 9 Drawing Sheets

(51) Int. Cl.
*C10G 33/08* (2006.01)
*B01D 17/12* (2006.01)
*C10G 33/02* (2006.01)
*C10G 32/02* (2006.01)
*B01D 17/04* (2006.01)

(52) U.S. Cl.
CPC ............ *C10G 32/02* (2013.01); *C10G 33/02* (2013.01); *C10G 33/08* (2013.01); *B03C 2201/02* (2013.01); *B03C 2201/24* (2013.01)

(56) References Cited

U.S. PATENT DOCUMENTS

| | | | |
|---|---|---|---|
| 3,704,222 | A | 11/1972 | Kusovsky et al. |
| 6,113,765 | A | 9/2000 | Wagner et al. |
| 6,179,991 | B1 | 1/2001 | Norris et al. |
| 6,428,669 | B2 | 8/2002 | Klippel et al. |
| 6,958,664 | B1 | 10/2005 | Lyke |
| 8,282,804 | B2 | 10/2012 | Tryti et al. |
| 9,440,241 | B2 | 9/2016 | Akdim et al. |
| 2001/0017264 | A1 | 8/2001 | Klippel et al. |
| 2003/0117150 | A1* | 6/2003 | Noik ................ B01D 19/0063 324/639 |
| 2011/0049133 | A1* | 3/2011 | Przybyla ................ H05B 6/60 219/647 |
| 2017/0173593 | A1 | 6/2017 | Woods |

OTHER PUBLICATIONS

Cheng, E.M., et al.; "The Use of Dielectric Mixture Equations to Analyze the Dielectric Properties of a Mixture of Rubber Tire Dust and Rice Husks in a Microwave Absorber" Progress in Electromagnetics Research, vol. 129 (2012); pp. 559-578.

Less, Simone, et al.; "The electrocoalescers' technology: Advances, strengths and limitations for crude oil separation" Journal of Petroleum Science and Engineering 81 (2012); pp. 57-63.

Malmberg, C.G., et al.; "Dielectric Constant of Water from 0 to 100 C" Journal of Research of the National Bureau of Standards, Research Paper 2641, vol. 56, No. 1, Jan. 1956; pp. 1-8.

Veena, M.G., et al.; "Dielectric properties of nanosilica filled epoxy nanocomposites" Sadhana vol. 41, No. 4, Apr. 2016; pp. 407-414.

International Search Report and Written Opinion for International Application No. PCT/US2019/016582 dated May 29, 2019; pp. 1-19.

Invitation to pay additional fees and, where applicable, protest fees dated Apr. 3, 2019.

* cited by examiner

METHOD AND APPARATUS FOR PROMOTING DROPLETS COALESCENSE IN OIL CONTINUOUS EMULSIONS

CROSS-REFERENCE TO RELATED APPLICATIONS

This application is a divisional of and claims priority from U.S. Non-provisional application Ser. No. 15/888,773 filed Feb. 5, 2018, and titled "METHOD AND APPARATUS FOR PROMOTING DROPLETS COALESCENCE IN OIL CONTINUOUS EMULSIONS," a copy of which is incorporated by reference in its entirety for purposes of U.S. patent practice.

BACKGROUND

Field of the Disclosure

The present disclosure generally relates to separation of fluids. More specifically, embodiments of the disclosure relate to the separation of an emulsion by promoting droplets coalescence using a controllable electrostatic field and adaptive permittivity.

Description of the Related Art

Produced hydrocarbons (such as crude oil) may contain water as well as other fluids. Consequently, the separation of water from oil is required in hydrocarbon processing to produce saleable products. Electrocoalescence for water-oil separation has been known for over a hundred years and the technology is now widely implemented in commercial applications. For example, electrocoalescers are installed in existing oil and gas production facilities around the world. Coalescer packings are also deployed in the oil and gas industry inside separator vessels to enhance the coalescence process but such packings typically do not work in synergy with an electrostatic field. In electrocoalescence, the droplet coalescence is believed to be triggered by the electric field if the droplets are very close to each other. At distances larger than a few droplet diameters, the electrostatic forces may not drive the approach and collision of the droplets, as the electrostatic forces that generate droplets' attraction are strongly dependent on the inter-droplets distance. Within the limitations of industrial equipment design, the electrostatic forces may be too inefficient to promote the droplets coalescence when the distance between droplets is equal to or greater than the droplet diameter.

SUMMARY

To address limitations with electrocoalescers, some prior art techniques introduce a flow disrupting element to prevent the droplet alignment and arching that would be driven by the electric field in a laminar flow. For example, U.S. Pat. No. 9,440,241 describes the advantage of introducing a flow disrupting element to enhance micro-turbulence and electrocoalescence between electrodes of a separation device. However, such prior art techniques fail to consider that turbulence is not the main flow characteristic that enhances the droplets contact rate. In some instances, increasing turbulence intensity locally with such a flow disrupting element may result in droplets breaking-up (that is, fluids re-mixing) and negatively impact separation. In contrast to the prior art techniques, the curvature of emulsion flow streamlines and the splitting and merging of stream-tubes can be the primary drivers of optimized droplets contact rate and contract time. Furthermore, such prior art techniques fail to consider any effect of the dielectric constant (that is, permittivity) of the flow disrupting element versus the dielectric constant of the water-oil-emulsion being separated.

Embodiments of the present disclosure improve electrocoalescer separation performance by designing and adjusting the dielectric properties of flow conditioner elements and maintaining the electric field at an optimal value. Embodiments of the disclosure further include an improved geometry of a flow conditioner to further improve efficiency of the separation process.

In one embodiment, an apparatus for the separation of a mixture of two liquids is provided. The apparatus includes a section configured to receive a mixture of two liquids and a first flow conditioner section downstream of the section, the first flow conditioner section having at least one first electrode for generating a first electric field and a first flow conditioner having a first permittivity. The apparatus also includes a second flow conditioner section downstream of the first flow conditioner section and having at least one second electrode for generating a second electric field and a second flow conditioner having a second permittivity. The apparatus further includes a permittivity measurement apparatus coupled to the first section and configured to measure the permittivity of the mixture and a flow conditioner section selector configured to receive the mixture permittivity from the permittivity measurement apparatus and energize the at least one first electrode of the first flow conditioner section or energize the at least one second electrode of the second flow conditioner section based on a comparison between the mixture permittivity and the first permittivity and the mixture permittivity and the second permittivity.

In some embodiments, the mixture is a water-in-oil emulsion. In some embodiments, the first flow conditioner is a helicoidal-shaped flow conditioner having a helicoidal flow path or a branched flow conditioner that includes a plurality of branched flow paths. In some embodiments, the second flow conditioner is a helicoidal-shaped flow conditioner having a helicoidal flow path or a branched flow conditioner that includes a plurality of branched flow paths. In some embodiments, the first flow conditioner is an inorganic material and a polymeric matrix. In some embodiments, the second flow conditioner is an inorganic material and a polymeric matrix. In some embodiments, a length of the first flow conditioner and a strength of the first electric field are selected such that the electroviscous number of the flow conditioner section is in the range of 1000 to 600000.

In another embodiment, a method of separating a mixture of two liquids via electrocoalescence is provided. The method includes providing the mixture to a separation apparatus. The separation apparatus includes a first flow conditioner section that includes at least one first electrode for generating a first electric field and a first flow conditioner having a first permittivity and a second flow conditioner section that includes at least one second electrode for generating a second electric field and a second flow conditioner having a second permittivity. The method further includes measuring the permittivity of the mixture, and comparing the mixture permittivity to the first permittivity and the second permittivity. The method also includes energizing the at least one first electrode of the first flow conditioner section or the at least one second electrode of the second flow conditioner section based on the comparison, such that only the first electric field or the second electric field is generated, and directing the mixture through the first electric field or the second electric field.

In some embodiments, the mixture is a water-in-oil emulsion. In some embodiments, the first flow conditioner is a helicoidal-shaped flow conditioner having a helicoidal flow path or a branched flow conditioner that includes a plurality of branched flow paths. In some embodiments, the second flow conditioner is a helicoidal-shaped flow conditioner having a helicoidal flow path or a branched flow conditioner that includes a plurality of branched flow paths. In some embodiments, a length of the first flow conditioner and a strength of the first electric field are selected such that the electroviscous number of the flow conditioner section is in the range of 1000 to 600000. In some embodiments, the method includes transmitting the measured permittivity to a flow conditioner section selector configured to energize the at least one first electrode of the first flow conditioner section or energize the at least one second electrode of the second flow condition section.

In some embodiments, another apparatus for the separation of a mixture of two liquids is provided. The apparatus includes a first section configured to receive the mixture, a permittivity measurement apparatus coupled to the first section and configured to measure the permittivity of the mixture, a flow conditioner section that includes an electrode for generating an electric field and a flow conditioner having a permittivity range, such that the permittivity range is a function of the frequency of the electric field. The apparatus also includes a frequency selector configured to receive the mixture permittivity from the permittivity measurement apparatus and energize the electrode of the flow conditioner section at a frequency based on a comparison between the mixture permittivity and permittivity range.

In some embodiments, the mixture is a water-in-oil emulsion. In some embodiments, the flow conditioner is a helicoidal-shaped flow conditioner having a helicoidal flow path or a branched flow conditioner that includes a plurality of branched flow paths. In some embodiments, the flow conditioner includes silica nanoparticles in an epoxy resin. In some embodiments, a length of the flow conditioner and a strength of the electric field are selected such that the electroviscous number of the flow conditioner section is in the range of 1000 to 600000.

In another embodiment, another method of separating a mixture of two liquids is provided. The method includes providing the mixture to a separation apparatus. The separation apparatus includes a permittivity measurement apparatus coupled to the first section and configured to measure the permittivity of the mixture, a flow conditioner section that includes an electrode for generating an electric field and a flow conditioner having a permittivity range, such that the permittivity range is a function of the frequency of the electric field, and a frequency selector configured to receive the mixture permittivity from the permittivity measurement apparatus and energize the electrode of the flow conditioner section at a frequency. The method further includes measuring the permittivity of the mixture and comparing the mixture permittivity to the permittivity range. The method also includes energizing the electrode of the flow conditioner section at a frequency based on the comparison between the mixture permittivity and permittivity range and directing the mixture through the electric field.

In some embodiments, the mixture is a water-in-oil emulsion. In some embodiments, the flow conditioner is a helicoidal-shaped flow conditioner having a helicoidal flow path or a branched flow conditioner that includes a plurality of branched flow paths. In some embodiments, the method includes transmitting the mixture permittivity to a frequency selector configured to receive the mixture permittivity from the permittivity measurement apparatus and energize the electrode of the flow conditioner section at the frequency.

In another embodiment, another apparatus for the separation of a mixture of two liquids is provided. The apparatus includes a first section configured to receive the mixture and a flow conditioner section that includes an electrode for generating an electric field and a first removable flow conditioner having a first permittivity, the flow conditioner section configured to receive a second removable flow conditioner having a second permittivity in place of the first removable flow conditioner. The apparatus also includes a permittivity measurement apparatus coupled to the first section and configured to measure the permittivity of the mixture and compare the mixture permittivity to the first permittivity.

In some embodiments, the mixture is a water-in-oil emulsion. In some embodiments, the first removable flow conditioner is a helicoidal-shaped flow conditioner having a helicoidal flow path or a branched flow conditioner that includes a plurality of branched flow paths. In some embodiments, the second removable flow conditioner is a helicoidal-shaped flow conditioner having a helicoidal flow path or a branched flow conditioner that includes a plurality of branched flow paths. In some embodiments, the first removable flow conditioner is an inorganic material and a polymeric matrix. In some embodiments, the second removable flow conditioner is an inorganic material and a polymeric matrix. In some embodiments, a length of the flow conditioner and a strength of the electric field are selected such that the electroviscous number of the flow conditioner section is in the range of 1000 to 600000.

In another embodiment, another method of separating a mixture of two liquids is provided. The method includes providing the mixture to a separation apparatus. The separation apparatus includes a flow conditioner section that includes an electrode for generating an electric field and a first removable flow conditioner having a first permittivity, the flow conditioner section configured to receive a second removable flow conditioner having a second permittivity in place of the first removable flow conditioner. The method also includes measuring the permittivity of the mixture, removing the first removable flow conditioner from the flow conditioner section, and installing the second removable flow conditioner in the flow conditioner section. The method further includes energizing the electrode of the flow conditioner section and directing the mixture through the electric field.

In some embodiments, the mixture is a water-in-oil emulsion. In some embodiments, the first removable flow conditioner is a helicoidal-shaped flow conditioner having a helicoidal flow path or a branched flow conditioner that includes a plurality of branched flow paths. In some embodiments, the second removable flow conditioner is a helicoidal-shaped flow conditioner having a helicoidal flow path or a branched flow conditioner that includes a plurality of branched flow paths

DETAILED DESCRIPTION

Figure 1:
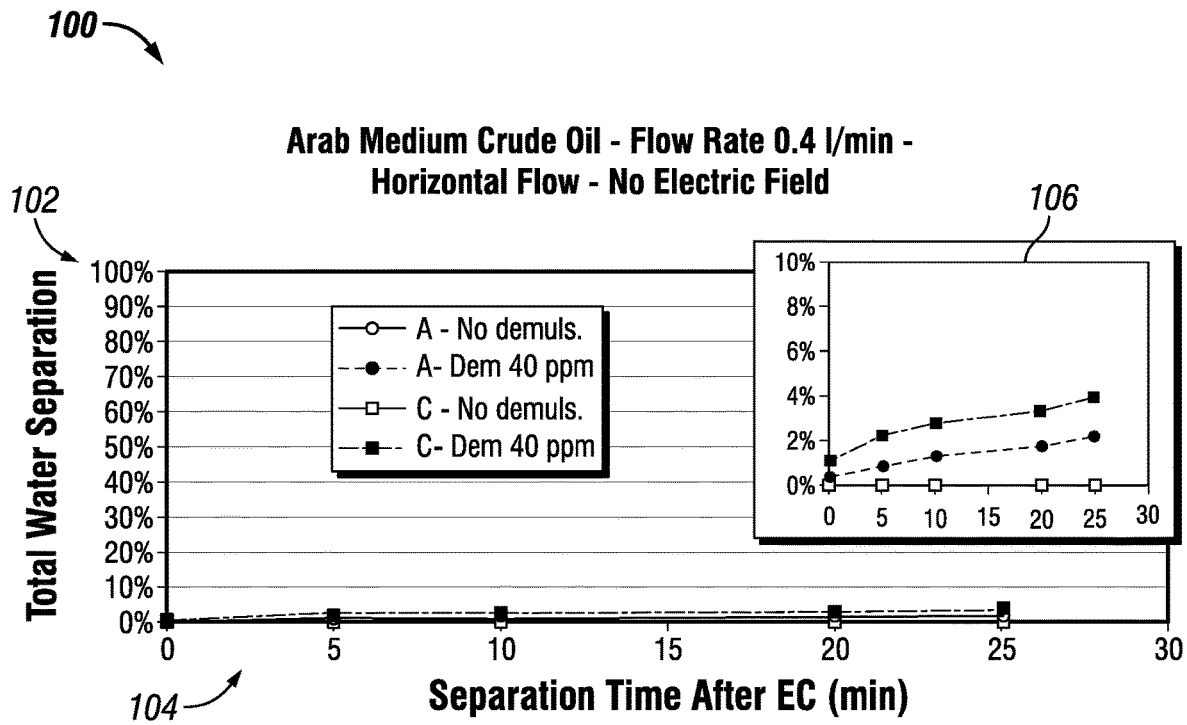
FIG. 1 is a graph of volume percentage of water separated vs. separation time after electrocoalescence (EC) illustrating the results of experiments for combinations of flow conditioners and demulsifier dosage.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a separation apparatus for the separation of mixture of two fluids (for example, a water-in-oil emulsion) via electrocoalescence and having a flow conditioner with a permittivity adaptive to the permittivity of the fluid flowing through the separation apparatus. As used herein, the term "flowing medium" may refer to the fluid flowing through the separation apparatus. As used herein, a flow conditioner may also be referred to as a "droplets collider." As used herein, the term "permittivity" refers to relative permittivity.

In one embodiment, a separation apparatus includes a measurement section and multiple sections having a flow conditioner with a different permittivity. The separation apparatus includes a dielectric measurement device that measures the permittivity of the flowing medium in the measurement section of the separation apparatus. The measured permittivity may be provided to a section selector that compares the measured permittivity to the stored permittivities of the flow conditioners and selects a flow conditioner having a permittivity that is equal to or as similar as possible to the measured permittivity. The section selector then energizes the electrodes (via an AC voltage generator) of the selected flow conditioner.

In another embodiment, a separation apparatus includes a measurement section and a section having a flow conditioner with a frequency-dependent permittivity. The separation apparatus includes a dielectric measurement device that measures the permittivity of the flowing medium in the measurement section of the separation apparatus. The measured permittivity may be provided to a frequency selector that selects an electric field frequency that causes the permittivity of the flow conditioner to be equal to or as similar as possible to the permittivity of the flowing medium. The frequency selector then energizes the electrodes (via an AC voltage generator) of the flow conditioner at the selected frequency.

In another embodiment, a separation apparatus includes a measurement section and a section having a replaceable flow conditioner with first permittivity. The replaceable flow conditioner may be replaced with a flow conditioner having a second permittivity. The separation apparatus includes a dielectric measurement device that measures the permittivity of the flowing medium in the measurement section of the separation apparatus. The measured permittivity may be provided to a computer for display. Based on the measured permittivity, the replaceable flow conditioner may be replaced with the flow conditioner having the second permittivity such that the second permittivity is equal to or as similar as possible to the measured permittivity of the flowing medium.

EXAMPLES AND EXPERIMENTS

The following examples and experiments are included to demonstrate embodiments of the disclosure. It should be appreciated by those of skill in the art that the techniques and apparatuses disclosed in the examples which follow represent techniques and apparatuses discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The examples and experiments described below demonstrate an improvement in separation performance obtained by optimizing the combination of flow conditioner and electric field and further show the influence of the geometry of the flow conditioner on the optimization. Experiments were conducted in a flow loop using a positive displacement pump, a temperature chamber hosting the electrodes section and the separation cones (to monitor the separation profiles of the treated emulsion samples), and a rack having a voltage amplifier, a function generator, an oscilloscope, and laptop as a controller. The computational simulation results were obtained using the COMSOL® Multiphysics simulation manufactured by COMSOL Inc. of Stockholm, Sweden.

The experiments were performed using three different flow conditioners. A highly branched flow conditioner (Type A) was used. As used herein, the term "highly branched" refers to a flow conditioner having multiple flow stream splitting and intersections that maximize inter-droplet contact. Flow conditioners of Type-A had a characteristic mixing length $L_m$=0.4 centimeters (cm)±2 millimeters (mm). A flow conditioner having a helicoidally shaped mixer (Type B, also referred to as a "helicoidal flow condition") was also used. Flow conditioners of Type-B had a characteristic mixing length $L_m$=1.0 cm±2 mm. As used herein, the term characteristic mixing length $L_m$ is defined as the average hydraulic diameter of the volume between two successive flow separation walls that, arranged in pattern, form the flow conditioner. A "flow conditioner" of Type C was an empty pipe and did not include any flow conditioning elements.

As described herein, the experimental data shows that the flow conditioner geometry affects and may improve the water-oil separation performance. In particular, the highly branched conditioner (Type-A) improves water-oil separation more than the other conditioner (Type-B). Moreover, both the Type-A and Type-B flow conditioners proved advantageous over the straight pipe (Type-C). Accordingly, a static flow conditioning element designed to improve droplets collision may improve water-oil separation over a simple electric field application inside a smooth pipe section as long as the induced turbulence does not lead to re-emulsification.

The electrostatic separation experiments were performed using oil-based emulsions prepared with an Arab Medium crude oil. Synthetic brine was prepared by adding 3.5% weight/volume (w/v) of sodium chloride (NaCl) to deionized water. Emulsions were formed by adding 20% volume (vol.) of synthetic brine and 80% vol. of crude oil and mixing for 40 seconds at 16,400 rpm with a T-25 ULTRA-TURRAX® homogenizer manufactured by IKA® of Staufen, Germany. The volume of emulsion used for each experiment was 500 millimeters (ml). As discussed below, in some experiments, 40 parts-per-million (ppm) of demulsifier were added to the crude oil prior to the mixing. In such experiments, the demulsifier type was the incumbent demulsifier used at the production site of the tested crude oil. Fluids were preheated to 45° C., and the experiments were conducted at a temperature of 45° C. Likewise, the separation curves of the samples previously exposed to the electric field were obtained in an oven set at a temperature of 45° C.

In each experiment, the applied electric field was 4.8 kilovolts/centimeter (kV/cm). The electric field was generated across electrodes spaced at 3.34 cm by applying a voltage of 16 kV. The waveform was sinusoidal with a frequency of 1 kilohertz (kHz). However, it should be appreciated that embodiments of the disclosure are not limited to the characteristics of the electric fields described in the experiments. For example, it should be appreciated that an optimization of the electric field characteristics may be performed for each crude oil quality. For example, the electric field intensity could range from few tens of volts/centimeter (V/cm) up to the point of incipient electrical discharge or droplet break-up. As will be further appreciated, the waveform used to generate the electric field may be based on a mathematical function optimized to sustain an optimal electric field amplitude while preventing short circuiting of the electrodes. The frequency may be optimized as discussed in more detail in below.

Base Case—Horizontal Flow and No Electric Field

The Arab Medium crude oil used in the experiments is known to form extremely stable emulsions. To set a baseline, some experiments were conducted in the absence of any electric field by circulating a sample of the Arab Medium crude oil emulsion through a Type A flow conditioner and an empty pipe (Type C), with and without the injection of a demulsifier (that is, the demulsifier dosage being either 40 ppm or 0 ppm). The percentage of the total water volume in the initial emulsion sample that segregated after a given separation time was measured to determine the separation performance. The volume percentage of water separated from the emulsion samples at time periods of 0 minute (min), 5 min, 10 min, 20 min, and 25 min was determined for a flow rate of about 0.4 liter/minute (l/min) (that is, about 12.3 seconds residence time). Table 1 depicts the results of the base case experiments for each combination of flow conditioner (Type A or Type C) and demulsifier dosage (0 ppm or 40 ppm):

TABLE 1

| VOL. PERCENTAGE OF WATER SEPARATED VS. TIME FOR BASE CASE | | | | |
|---|---|---|---|---|
| Separation time (min) | Type-A (0 ppm demulsifier) | Type-A (40 ppm demulsifier) | Type C (0 ppm demulsifier) | Type C (40 ppm demulsifier) |
| 0 | 0% | 0.4% | 0% | 1.1% |
| 5 | 0% | 0.9% | 0% | 2.2% |
| 10 | 0% | 1.3% | 0% | 2.8% |
| 20 | 0% | 1.7% | 0% | 3.3% |
| 25 | 0% | 2.2% | 0% | 3.9% |

FIG. 1 is a graph 100 of volume percentage of water separated vs. separation time after electrocoalescence (EC) illustrating the results of the base case experiments for each combination of flow conditioner (Type A or Type C) and demulsifier dosage (0 ppm or 40 ppm). As shown FIG. 1, the y-axis 102 depicts volume percentage of water separated and the x-axis 104 depicts separation time. FIG. 1 also includes an inset graph 106 with different intervals on the y-axis 102 and x-axis 104 to further illustrate the results of the base case experiments.

Configuration 1: Horizontal Flow and Short Flow Conditioners

In the first configuration, experiments were conducted using Arab Medium crude oil emulsions flowing in the horizontal direction. The emulsions were formed with the Arab Medium crude oil with the addition of 40 ppm of demulsifier. The experiments were performed using each of the Type A, Type B, and Type C flow conditioners oriented horizontally. A flow rate of 0.4 l/min was used in all the experiments, which corresponds to a residence time in the applied electric field of about 12 seconds. Here again, the percentage of the total water volume in the initial emulsion sample that segregated after a given separation time was measured to determine the separation performance. The volume percentage of water separated from the emulsion samples at time periods of 0 minutes (min), 5 min, 10 min, 20 min, and 25 min was determined. Two runs of the Type C flow conditioner were performed. Table 2 depicts the results of first configuration experiments for each flow conditioner (Type A, Type B or Type C):

TABLE 2

VOL. PERCENTAGE OF WATER SEPARATED VS. TIME FOR FIRST CONFIGURATION

| Separation time (min) | Type-A (40 ppm demulsifier) | Type-B (40 ppm demulsifier) | Type C (40 ppm demulsifier) | Type C (40 ppm demulsifier), 2nd run |
|---|---|---|---|---|
| 0 | 40% | 30% | 7.5% | 7.5% |
| 5 | 80% | 60% | 25% | 25% |
| 10 | 85% | 65% | 32.5% | 35% |
| 20 | 85% | 70% | 40% | 45% |
| 25 | 85% | 70% | 40% | 45% |

Figure 2:
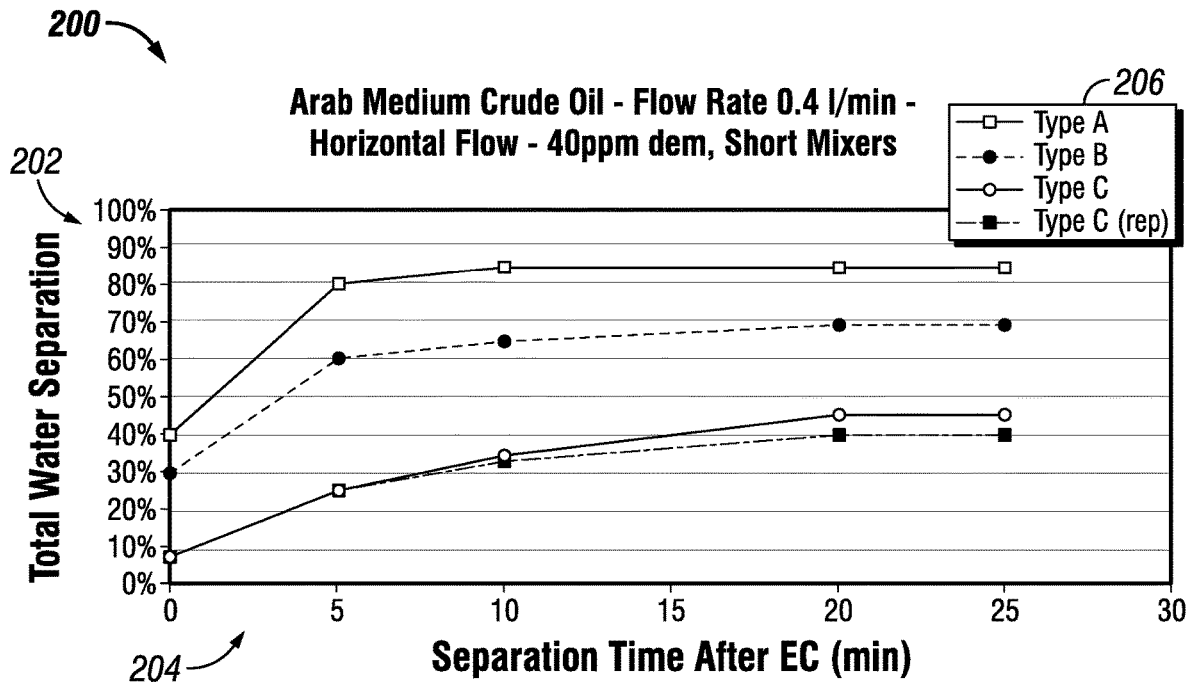
FIG. 2 is a graph of volume percentage of water separated vs. separation time after electrocoalescence (EC) illustrating the results of experiments for a first configuration of different flow conditioners.

FIG. 2 is a graph 200 of volume percentage of water separated vs. separation time after EC illustrating the results of the first configuration experiments for each flow conditioner (Type A, Type B, or Type C). As shown FIG. 2, the y-axis 202 depicts volume percentage of water separated and the x-axis 204 depicts separation time.

The results shown in Table 2 and FIG. 2 illustrate the performances of the flow conditioners and demonstrate the importance of their geometry for enhancing phase separation. The Type A flow conditioner provided the highest separation performance and improved water separation to over 80% in 10 minutes. The Type B flow conditioner had the next highest separation performance, allowing a separation of 65% of the water in 10 minutes. The two runs performed with the Type C flow conditioner (empty pipe) show separation performances which approach 35% of resolved water in 10 minutes.

Experiments were also performed using the first configuration and a higher flowrate, to evaluate the combined effect of higher turbulence and shorter residence time in the electric field region. The experiments were conducting using the Type A and Type C flow conditioners at a flowrate of 0.8 l/min determining an average flow velocity twice as fast as the previous first configuration experiments, at about 2.3 cm/s. The volume percentage of water separated from the emulsion samples at time periods of 0 minutes (min), 5 min, 10 min, 20 min, and 25 min was determined. Table 3 depicts the results of first configuration experiments at the higher flow rate and Type A and Type C flow conditioners:

TABLE 3

VOL. PERCENTAGE OF WATER SEPARATED VS. TIME FOR FIRST CONFIGURATION AT HIGHER FLOW RATE

| Separation time (min) | Type-A (40 ppm demulsifier) | Type-C (40 ppm demulsifier) |
|---|---|---|
| 0 | 15% | 7.5% |
| 5 | 30% | 12.5% |
| 10 | 35% | 15% |
| 20 | 40% | 22.5% |
| 25 | 45% | 25% |

Figure 3:
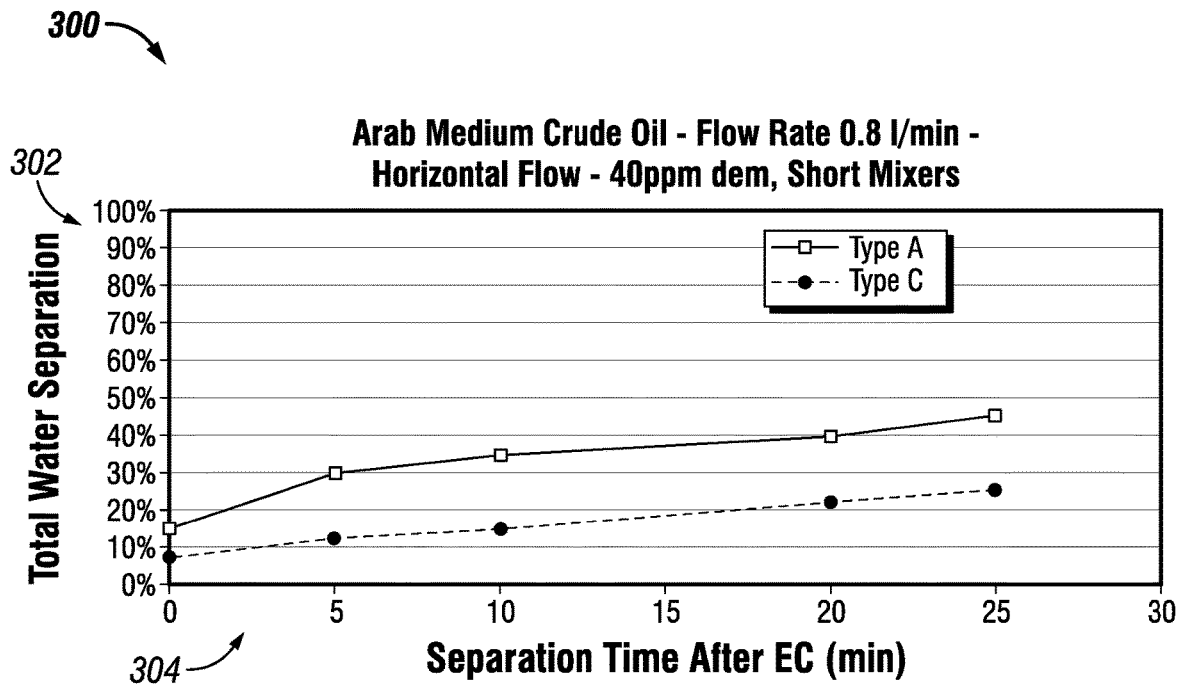
FIG. 3 is a graph of volume percentage of water separated vs. separation time after electrocoalescence (EC) illustrating the results of experiments for a first configuration of different flow conditioners at higher flowrates.

FIG. 3 is a graph 300 of volume percentage of water separated vs. separation time after EC illustrating the results of the first configuration experiments at the higher flowrates for the Type A and Type C flow conditioners. As shown FIG. 3, the y-axis 302 depicts volume percentage of water separated and the x-axis 304 depicts separation time.

As shown in Table 3 and FIG. 3, the separation performance decreases as compared to the lower flowrate used to produce the results shown in Table 2 and FIG. 2. After 10 minutes of separation, the separation performance decreases by 59% for the Type A flow conditioner and by 55% for the Type C flow conditioner. By using twice as long flow conditioners, the separation performance decrease was demonstrated to be primarily attributed to the shorter residence time of the emulsions under the electric field.

Configuration 2: Vertical Flow and Short Flow Conditioner

In the second configuration, experiments were conducted using Arab Medium crude oil emulsions flowing in the horizontal direction. The emulsions were formed with the Arab Medium crude oil with the addition of 40 ppm of demulsifier. The second configuration experiments were conducted to demonstrate the applicability of the disclosure via the integration of electrodes in the downward (that is, vertical) leg of industrial separator inlet devices. As a result, embodiments of the disclosure may have applications in the integration within separator inlet devices, such that the use of electric field is synergized with the flow turbulence existing in such devices.

The experiments were performed using Type A and Type C flow conditioners oriented vertically. A feedstream flow rate of 0.4 l/min was used, with the downward velocity was determined by gravity. Here again, the percentage of the total water volume in the initial emulsion sample that segregated after a given separation time was measured to determine the separation performance. The volume percentage of water separated from the emulsion samples at time periods of 0 minutes (min), 5 min, 10 min, 20 min, and 25 min was determined. Two runs of the Type C flow conditioner were performed. Table 4 depicts the results of first configuration experiments for each flow conditioner (Type A or Type C):

TABLE 4

VOL. PERCENTAGE OF WATER SEPARATED VS. TIME FOR SECOND CONFIGURATION

| Separation time (min) | Control | Type-A (40 ppm demulsifier) | Type-C (40 ppm demulsifier) |
|---|---|---|---|
| 0 | 0% | 15% | 7.5% |
| 5 | 0% | 30% | 12.5% |
| 10 | 0% | 35% | 15% |
| 20 | 0% | 40% | 22.5% |
| 25 | 0% | 45% | 25% |

Figure 4:
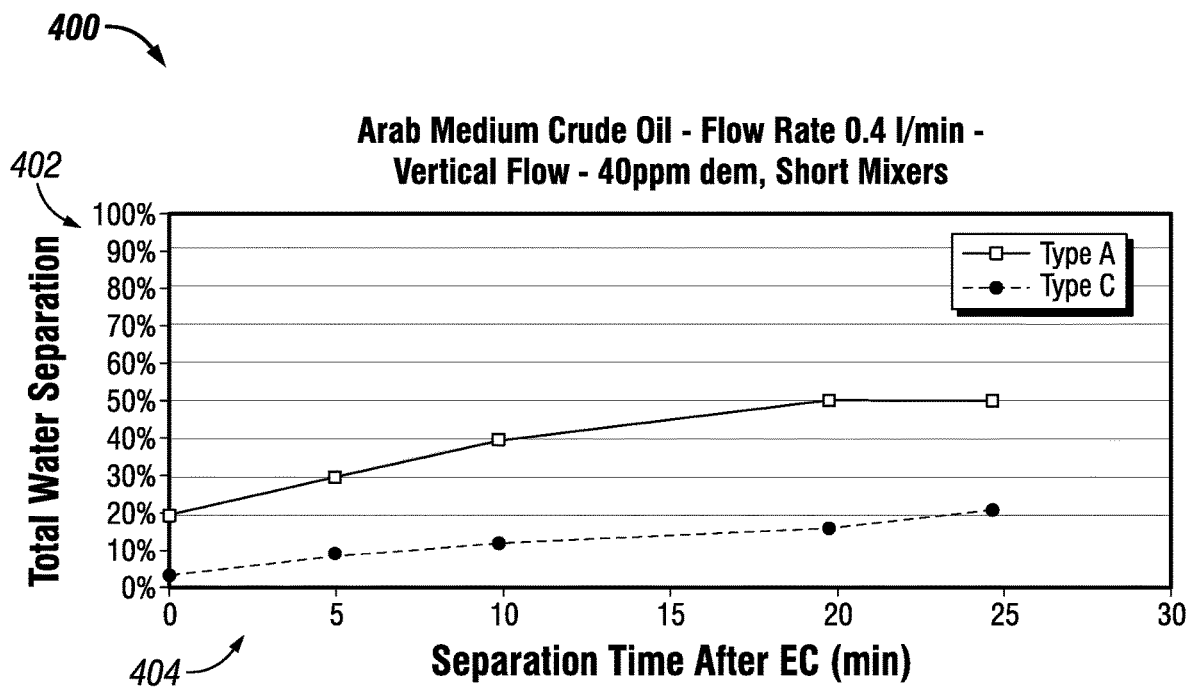
FIG. 4 is a graph of volume percentage of water separated vs. separation time after electrocoalescence (EC) illustrating the results of experiments for a second configuration of different flow conditioners.

FIG. 4 is a graph 400 of volume percentage of water separated vs. separation time after EC illustrating the results of the second configuration experiments for the Type A and Type C flow conditioners. As shown FIG. 4, the y-axis 402 depicts volume percentage of water separated and the x-axis 404 depicts separation time.

The relatively low separation performance was a result of the short residence time in the electric field. However, Table 4 and FIG. 4 show an improvement in separation performance using the Type A flow conditioner as compared to the Type C flow conditioner.

Configuration 3: Horizontal Flow and Longer Flow Conditioner

In the third configuration, experiments were conducted using Arab Medium crude oil emulsions flowing in the horizontal direction in flow conditioners longer than the flow conditioners used in the first configuration. The experimental results of the second configuration suggested that higher flowrates may lead to inefficient water separation. The third configuration experiments were conducted to determine whether the performance decrease using the second configuration was due to excessive turbulence inside the flow conditioners or from shorter residence time in the electric field.

The emulsions were formed with the Arab Medium crude oil with the addition of 40 ppm of demulsifier. The experiments were performed using the Type A, Type B, and Type C flow conditioners oriented horizontally and with a length twice as long as the flow conditioners used in the first configuration. A flow rate of 0.8 l/min was used in all the experiments to replicate the 2.3 cm/s emulsion flowing velocity used in the first configuration experiments that produced the results shown in Table 3. Consequently, the emulsion residence time under the electric field was increased from about 6.6 seconds up to about 13.9 seconds, while the mechanical mixing energy per unit time was the same.

The percentage of the total water volume in the initial emulsion sample that segregated after a given separation time was measured to determine the separation performance. The volume percentage of water separated from the emulsion samples at time periods of 0 minutes (min), 5 min, 10 min, 20 min, and 25 min was determined. Two runs of the Type C flow conditioner were performed. Table 5 depicts the results of the third configuration experiments for each flow conditioner (Type A, Type B, and Type C):

TABLE 5

VOL. PERCENTAGE OF WATER SEPARATED VS. TIME FOR THIRD CONFIGURATION

| Separation time (min) | Control | Type-A (40 ppm demulsifier) | Type B (40 ppm demulsifier) | Type C (40 ppm demulsifier), 2nd run |
|---|---|---|---|---|
| 0 | 0% | 58.8% | 30% | 24% |
| 5 | 0% | 88.2% | 45% | 40% |
| 10 | 0% | 94.1% | 60% | 52% |
| 20 | 0% | 94.1% | 65% | 60% |
| 25 | 0% | 94.1% | 70% | 60% |

Figure 5:
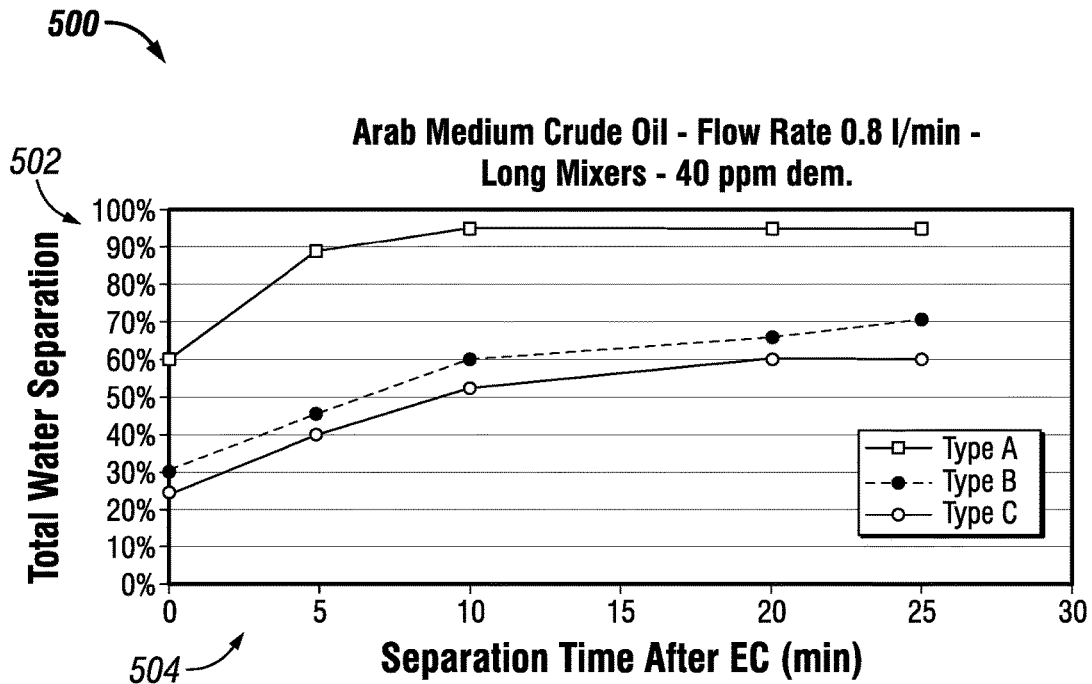
FIG. 5 is a graph of volume percentage of water separated vs. separation time after electrocoalescence (EC) illustrating the results of experiments for a third configuration of different flow conditioners.

FIG. 5 is a graph 500 of volume percentage of water separated vs. separation time after EC illustrating the results of the third configuration experiments for each flow conditioner (Type A, Type B, or Type C). As shown FIG. 5, the y-axis 502 depicts volume percentage of water separated and the x-axis 504 depicts separation time.

As shown in Table 5 and FIG. 5, the separation performance is significantly increased. The water separation obtained using the Type A flow conditioner approaches 100%. The results of the third configuration experiments illustrate the importance of selecting an optimal residence time and the synergistic effect of static flow conditioners and an electric field.

The experimental results support two additional conclusions. First, even at a greater flow rate, the flow conditioners do not offset the effect of the electric field by breaking up the water droplets after the coalescence events. Second, the geometry of the flow conditioner may be a primary factor in the separation performance. For example, based on the experimental results, the type B flow conditioner consistently provided a separation performance that was between the Type C (empty pipe) flow conditioner and Type A flow conditioner. In another example, the Type A flow conditioner provided the best separation performance for all experiments and conditions.

Electrohydrodynamic Dimensionless Numbers

For certain embodiments (such as, for example, relatively larger industrial systems), a range for the electroviscous number (Nev) was determined from the experimental results described above. Nev may be defined as the ratio of the dielectric electric Rayleigh number (Ra) and may provide a quantification of the dominance of electrostatic forces over kinetic forces. Nev may be determined according to Equation 1:

$$N_{ev} = \frac{Ra}{Re} \qquad (1)$$

Where Ra and Re are determined according to Equations 2 and 3:

$$Ra = \frac{\epsilon_0 E_0^2 L^2}{\rho \cdot v^2} \qquad (2)$$

$$Re = \frac{L_m \cdot U_0}{v} \qquad (3)$$

Where $\rho$ is the fluid density in kilograms/meters$^3$ (kg/m$^3$), $v$ is the kinematic viscosity in meters/seconds (m$^2$/s), $\epsilon_0$ is the vacuum permittivity in farads/meter (F/m), $L_m$ is the system characteristic length in meters (m), L is the flow conditioner length in meters (m), $E_0$ is the electric field in volts/meter (V/m), and $U_0$ is the average fluid velocity in meters/seconds (m/s).

Solving Equations 1-3 using the experimental data results in an identification of an electroviscous number Nev in the range of 1000 to 600000. Thus, an Nev in the range of 1000 to 600000 may be used for the preliminary design of a separation apparatus in accordance with the embodiments described in the disclosure. As will be appreciated, such systems may be effective as long as the electric field E is below a critical value $E_{max}$ that leads to the onset of droplets breakup. The value of $E_{max}$ may vary between emulsions but, in some embodiments, may be set at $E_{max}$=6 kilovolts/centimeter (kV/cm) based on possible inter-droplet field intensification phenomena. Further, in some embodiments, $L_m$ should not exceed 2 cm to provide for an efficient droplet collision process.

Optimizing the Electric Field and Coalescence Forces

As will be appreciated, various techniques are known (such as, for example, the Lichtenecker equation) for the determination of the dielectric properties of a mixture of oil and water according to their relative proportions, dielectric constants, and the temperature (which has a particular effect on the water phase dielectric constant). Using the Lichtenecker equation, the variation of the dielectric properties of an oil-water mixture was evaluated for a water content in the range of 0% to 40% and a temperature in the range of 20° C. to about 60° C. Table 6 depicts the % variation of the dielectric constant of the oil-water mixture at various water contents and temperatures, with respect to the permittivity of pure oil at 20° C. (assumed to be 2.5):

TABLE 6

VARIATION OF DIELECTRIC CONSTANT (PERMITTIVITY) OF WATER-OIL MIXTURE WITH WATER CUT AND TEMPERATURE

| Water content | % variation of dielectric constant (20° C.) | % variation of dielectric constant (40° C.) | % variation of dielectric constant (60° C.) |
|---|---|---|---|
| 5 | 15% | 15% | 15% |
| 10 | 33% | 32% | 32% |
| 15 | 54% | 53% | 53% |
| 20 | 80% | 79% | 78% |
| 25 | 112% | 110% | 108% |
| 30 | 151% | 148% | 145% |
| 35 | 198% | 194% | 189% |
| 40 | 257% | 250% | 243% |

As shown in Table 6, the variation of the oil-water mixture dielectric constant is not negligible, and a greater water content results in a greater temperature effect on the dielectric constant. Consequently, because real-world production environments typically involve both fluctuating temperature and water content over time (for example, as a result of the temperature difference between daytime and nighttime), the variation of the dielectric constant may be significant and may affect the performance of electrocoalescers. As discussed below, the simulation results described in the disclosure demonstrate that a change in dielectric properties of this magnitude may have a negative effect on the electric field distribution and result in a decrease in performance of an electrocoalescer system. However, existing electrocoalescer systems fail to account for these effects of variation of dielectric properties in fluids. In contrast, however, embodiments described in the disclosure may detect these variations and minimize their impact on the separation performance of an electrocoalescer system.

Figure 6:
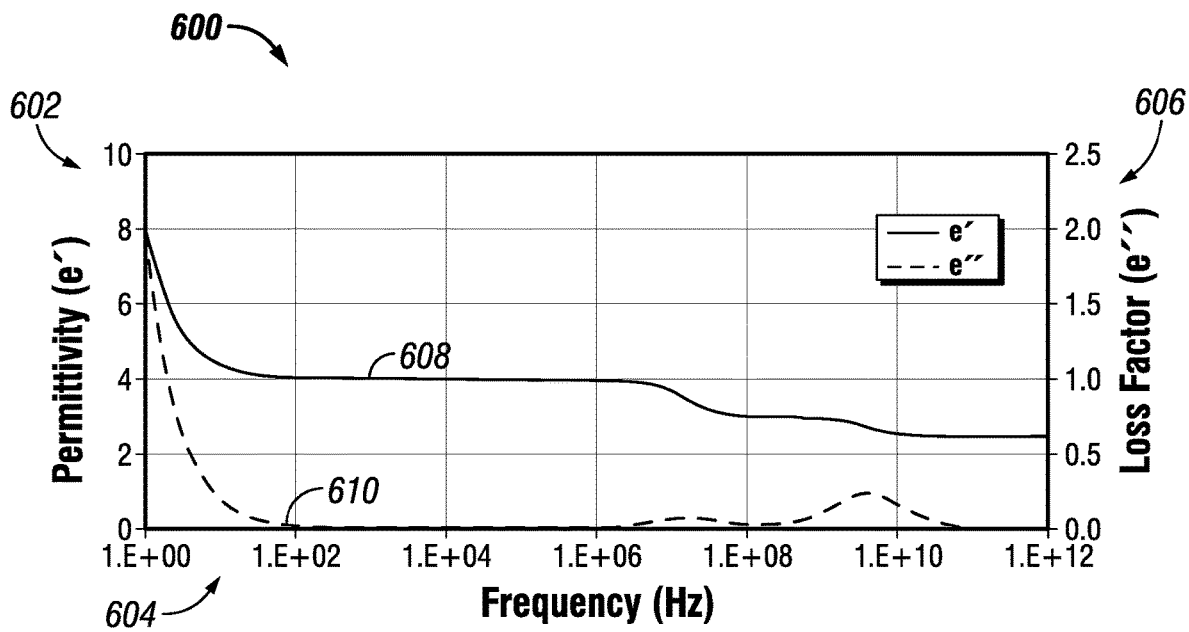
FIG. 6 is a graph of the permittivity (real and imaginary parts) of a water-in-oil emulsion vs frequency illustrating the frequency-dependent behavior of the dielectric constant of the water-in-oil emulsion.

Moreover, the dielectric properties of the flowing medium (for example, a water-in-oil emulsion) effect the efficiency of the electrocoalescence process. The dielectric constant of a water-in-oil emulsion depends on the water-to-oil volume ratio and the water salinity. FIG. 6 is a graph 600 of the permittivity of a water-in-oil emulsion vs frequency illustrating the frequency-dependent behavior of the dielectric constant of the water-in-oil emulsion. As shown FIG. 6, the left y-axis 602 depicts the permittivity value and the x-axis 604 depicts the frequency in hertz (Hz). As also shown in FIG. 6, the right y-axis 606 depicts the loss factor value (e"). The permittivity is depicted by line 608 in FIG. 6, and the loss factor is depicted by line 610 in FIG. 6.

Figure 7:
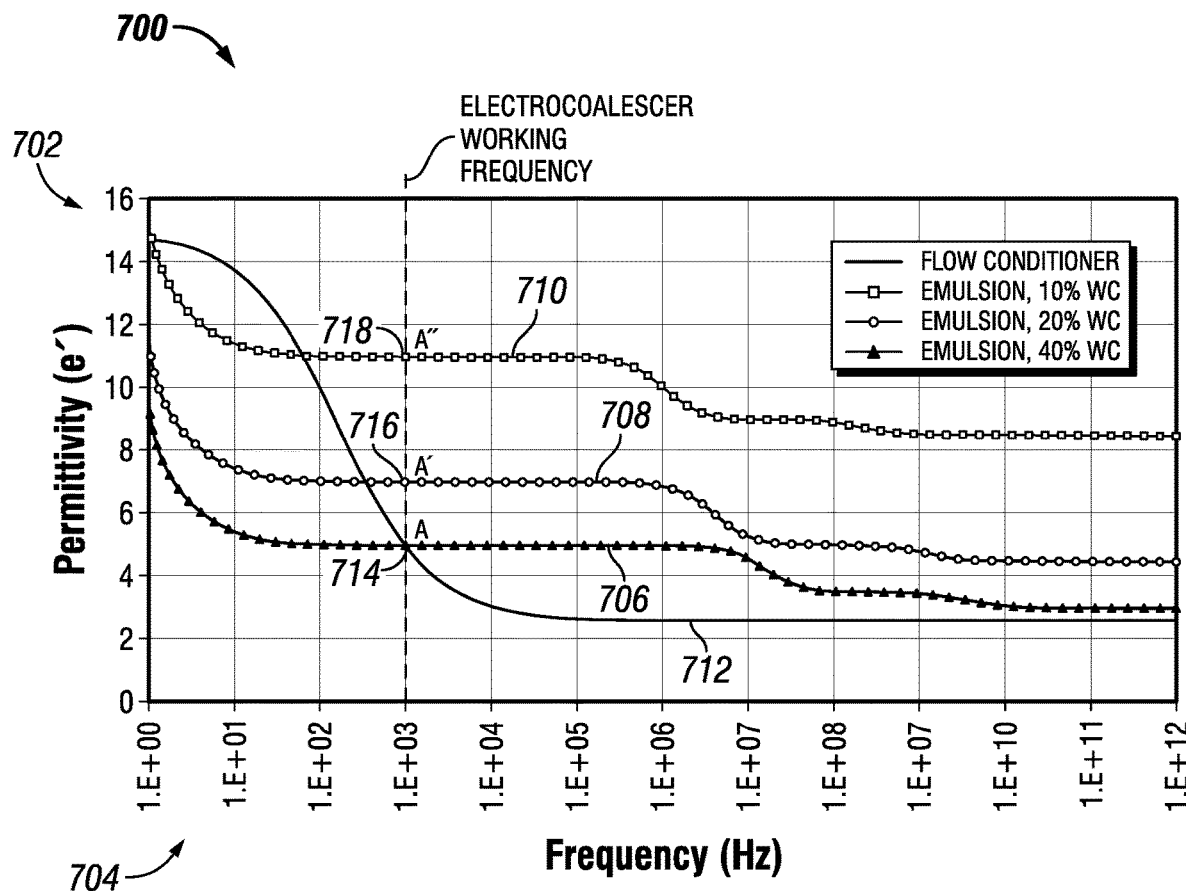
FIG. 7 is a graph of permittivity vs. frequency for a water-in-oil emulsion that depicts the effect of the water cut on the permittivity of the water-in-oil emulsion.

FIG. 7 is a graph 700 of permittivity vs. frequency for a water-in-oil emulsion that depicts the effect of the water cut on the permittivity. As shown FIG. 7, the y-axis 702 depicts the permittivity value and the x-axis 704 depicts the frequency in hertz (Hz). As also illustrated in FIG. 7, line 706 depicts the permittivity of a water-in-oil emulsion having a 10% water cut, line 708 depicts the permittivity of a water-in-oil emulsion having a 20% water cut, and line 710 depicts the permittivity of a water-in-oil emulsion having a 40% water cut. FIG. 7 also depicts line 712 corresponding to the permittivity of an example flow conditioner.

The dielectric constant of a water-in-oil emulsion depend on variables such as temperature, water salinity, water content and crude oil composition, all of which may have an impact on electrocoalescence. For example, the flow conditioner embedded into an electrocoalescence system was assumed to have a permittivity which, at the working frequency of 1 kHz, matched (that is, was equal to) the permittivity of a flowing emulsion with 10% water cut. At this condition, corresponding to point A (714) in FIG. 7, electrocoalescence efficiency may be maximized. Moreover there is no difference in the permittivities of the water-in-oil emulsion and the flow conditioner.

As will be appreciated, as an oil reservoir ages, more water is coproduced with the crude oil. Additionally, to guarantee a homogeneous exploitation of the reservoir, production wells are used in different combinations, as determined by the reservoir engineers. As a result, the production facility receiving the well streams may experience frequent variations in the water cut in the received streams. As shown in FIG. 7, an increase in the water cut may affect the emulsion permittivity with a translation of the permittivity curve for a water-in-oil emulsion to the left and upward, as shown by line 708 to line 710, and by line 710 to line 712). As illustrated in FIG. 7, this translation identifies a new operating condition at point A' (716), and then at point A" (718) as the water cut increases.

The following paragraphs describe how a change in the emulsion dielectric properties affects the separation efficiency of existing electrocoalescer systems by modifying the electric field inside the fluid volume of the electrocoalescer system.

A computational simulations study was conducted using the COMSOL Multiphysics scientific software package. As discussed below, the simulation showed that a difference between dielectric constants of the flow conditioner material and the flowing medium will lead to electric field inhomogeneities that are proportional to the difference in dielectric constants.

Table 7 provides a quantification of this effect and shows the impact of the relative permittivity ratio $\varepsilon r_{emulsion}/\varepsilon r_{conditioner}$ on the maximum (Emax) and minimum (Emin) electric fields in the fluid domain.

TABLE 7

EFFECT OF RELATIVE PERMITTIVITY RATIO ON MAXIMUM AND MINIMUM ELECTRIC FIELDS

| $\varepsilon r_{emulsion}/\varepsilon r_{conditioner}$ | \|Emax\| (kV/cm) | \|Emin\| (kV/cm) |
|---|---|---|
| 1/6 | 43% | 20% |
| 1/5 | 39% | 19% |
| 1/4 | 33% | 18% |
| 1/3 | 26% | 17% |
| 1/2 | 17% | 13% |
| 1 | 0% | 0% |
| 2 | −18% | −22% |
| 3 | −30% | −35% |
| 4 | −39% | −45% |
| 5 | −45% | −52% |
| 6 | −50% | −57% |

The computer simulations were run assuming a constant flow conditioner permittivity of 2.5 and an average electric field of 1.6 kV/cm. To perform the simulations, the geometry of flow conditioner Type A used in the experiments described above was created numerically, and then the electric field was computed in the fluid volume flowing through the flow conditioner. In order to remove edge effects and be as conservative as possible, the results were obtained for an inner square section of the fluid domain, with square length equal to half of the internal diameter of the flow conditioner.

FIG. 7 shows that a water-in-oil emulsion having a 40% water cut (line 710) has a permittivity of 11 at frequencies in the range of about 100 hertz up to about 100,000 hertz (that is, frequencies commonly used in electrocoalescers). Consequently, in this example, the permittivity ratio is about 4.4 (water-in-oil emulsion permittivity/flow conditioner permittivity=11/2.5). As shown in Table 7, this permittivity ratio will result in a variation of the maximum and minimum electric fields intensity of about −39% and about −45% respectively of the expected value. As will be appreciated, this is a significant reduction in the electric field and may have dramatic negative effect on the electrocoalescer efficiency, as the dipolar force driving the droplets attraction in the electrocoalescer is proportional to the second power of the electric field intensity.

Separation Apparatuses with Adaptive Permittivity Flow Conditioners

As discussed herein, embodiments of the disclosure advantageously have a flow conditioner that adapts its permittivity to the permittivity of the flowing medium (for example, a water-in-oil emulsion). Advantageously, as shown in Table 7, ensuring that the permittivity of the flow conditioner is equal to (for example, 1:1) or as similar as possible to the permittivity of the flowing medium minimizes the variation in the maximum and minimum electric fields intensity and resulting negative impact on separation performance. In view of the foregoing, embodiments of the disclosure that implement adaptive permittivity flow conditioners in a separation apparatus are described below.

Figure 8:
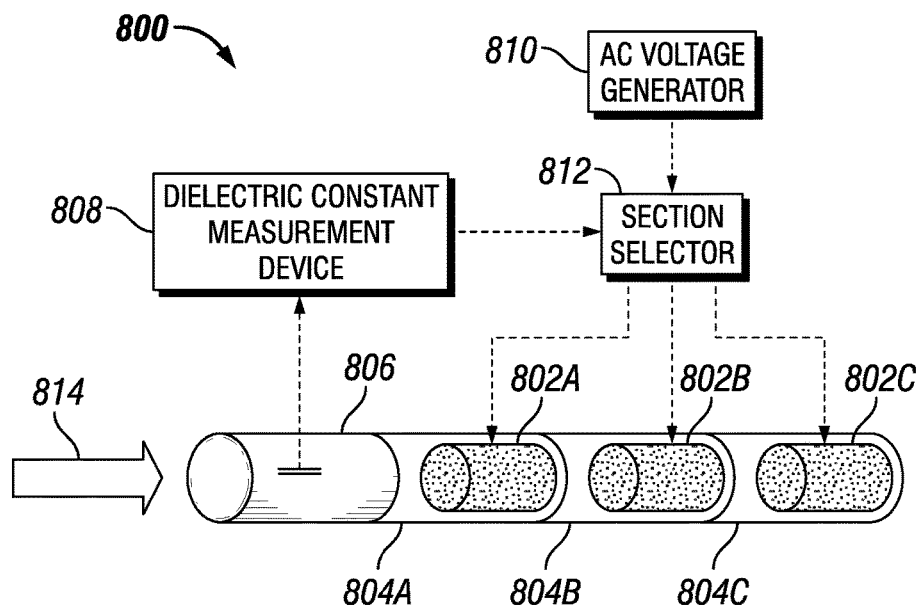
FIG. 8 is a schematic diagram of a separation apparatus having a series of flow conditioners having different permittivities and disposed in a series of sections of the separation apparatus in accordance with an embodiment of the disclosure.

FIG. 8 depicts a separation apparatus 800 having a series of flow conditioners 802 constructed from materials having different permittivities and disposed in a series of sections 804 of the apparatus 800 in accordance with an embodiment of the disclosure. The apparatus may include a measurement section 806, dielectric constant measurement device 808, an AC voltage generator 810, and a section selector 812. In some embodiments, the sections of the separation apparatus 800 may be generally cylindrical (for example, tubular) shaped. As described below, the separation apparatus 800 may measure the dielectric constant of a flowing medium in the measurement section 806 and select one of the flow conditioners 802 that has a permittivity closest to the permittivity of the flowing medium.

As shown by arrow 814, an emulsion may enter the measurement section 806 of the separation apparatus 800. The dielectric constant measurement device 808 may measure the dielectric properties of the flowing medium and transmit the permittivity to the section selector 812. The section selector may be powered by the AC voltage generator 810. In response to the permittivity of the flowing medium received from the dielectric constant measurement device 808, the section selector 812 may energize the electrode of the section 804 having the flow conditioner with a permittivity that is equal to or as similar as possible to the permittivity of the flowing medium. As used herein, the term "as similar as possible to" refers to a flow conditioner permittivity that is as close as possible in value to the permittivity of the flowing medium as is achievable by the physical properties of the flow conditioner materials. For example, in some embodiments of the separation apparatus 800, the permittivity of a selected flow conditioner may be within a threshold difference of the permittivity of the flowing medium. In some embodiments, the threshold difference may be less than 1%, less than 2%, less than 3%, less than 4%, or less than 5%.

The section selector 812 may include logic to compare a received measured permittivity to a list of stored permittivities. In some embodiments, the section selector 812 may include an application-specific integrated circuit (ASIC) or a field-programmable gate array (FPGA). In some embodiments, the section selector 812 may include a microprocessor, such as a reduced instruction set computing (RISC) processor or a complex instruction set computing (CISC) processor. The section selector 812 may include volatile memory, such as random access memory (RAM), and non-volatile memory, such as ROM, flash memory, any other suitable optical, magnetic, or solid-state storage medium, or a combination thereof. The memory may store a list of permittivities associated with the flow conditioners 802. The memory may store an identifier or other indicator associated with each permittivity (for example, in a list or other data structure) that indicates the appropriate signal for energizing the electric field of a flow conditioner associated with the permittivity.

Each of the sections 804 may include one or more electrodes for generating an electric field in that section for electrocoalescence in the flowing medium. As shown in FIG. 8, the three flow conditioners 802 may each have a different permittivity. For example, the flow conditioner 802A disposed in section 804A may have a first permittivity, the flow conditioner 802B disposed in section 804B may have a second permittivity different from the first permittivity, and the flow conditioner 802C disposed in section 804C may have a third permittivity different from the first and second permittivity. In one example, a flowing medium in the measurement section 806 may have a measurement permittivity that mostly closely matches the first permittivity of the flow conditioner 802A. In this example, the section selector 812 would energize the electrode in the section 804A having the flow conditioner 802A. The electrodes in sections 804B and 804C would not be energized and, consequently, no electric field would be generated in those sections. In another example, a flowing medium in the measurement section 806 may have a measurement permittivity that mostly closely matches the permittivity of the flow conditioner 802C. In this example, the section selector 812 would energize the electrode in the section 804C having the flow conditioner 802C. The electrodes in sections 804A and 804B would not be energized and no electric field would be generated in those sections.

The flow conditioners 802 may have varying permittivity by using different dielectric materials to construct the flow conditioner. In some embodiments, a dielectric material of a given permittivity may be formed from the insertion of an inorganic filler into a polymeric matrix. For example, in some embodiments the first flow conditioner 802A may have a first inorganic filler in a first polymeric matrix, the second flow conditioner 802B may have a second inorganic filler in a second polymeric matrix, and the third flow conditioner 802C may have a third inorganic filler in a third polymeric matrix. In some embodiments, the inorganic filler may be $Al_2O_3$, $BaTiO_3$, $TiO_2$, or $ZrO_2$. As will be appreciated, the amount and type of inorganic filler to be added to the polymeric matrix may be adjusted to produce a material having the desired dielectric properties. Additionally, it should be appreciated that the polymeric matrix may be selected having relatively low water and crude oil uptake (as compared to other matrices) to minimize changes in the dielectric constant of the flowing medium. Table 8 depicts example inorganic fillers and example polymers that may be used to construct a flow conditioner suitable for use with embodiments of the disclosure:

TABLE 8

EXAMPLE FLOW CONDITIONER MATERIALS

| Inorganic filler | Permittivity (dielectric constant) | Polymer | Permittivity (dielectric constant) |
|---|---|---|---|
| $TiO_2$ | 100 | Polyimide | 2.8-3.2 |
| Neoprene | 78 | Fluorinated polyimide | 2.5-2.9 |
| $Al_2O_3$ | 9-10 | Methylsilsesquioxane | 2.6-2.8 |
| $SiO_2$ | 3.9 | Polyarelene ether | 2.6-2.9 |
| $BaTiO_3$ | 1200-10000 | Polyethylene | 2.3-2.7 |
| $ZrO_2$ | 22 | Polystyrene | 2.5-2.9 |
|  |  | Teflon AF | 2.1 |

For example, in some embodiments, the flow conditioners 802 may be constructed from $BaTiO_3$, $TiO_2$, or $ZrO_2$ in a polyimide matrix.

In other embodiments, the flow conditioners 802 may be constructed using a ceramic material having closed cell porosity. In some embodiments in which the flowing medium includes sand particles, flow conditioners construction using a ceramic material may be used to minimize erosion caused by the sand particles.

One or more of the flow conditioners 802A, 802B, and 802C may each include a static mixer having a highly branched geometry or a helicoidal geometry. In some embodiments, one or more of the flow conditioners 802A, 802B, and 802C may be a straight pipe without a static mixer. In some embodiments, the flow conditioners 802A, 802B, and 802C may have different geometries. For example, the flow conditioners 802A and 802B may have a static mixer with a highly branched geometry and the flow conditioner 802C may have a static mixer with a helicoidal geometry. In other embodiments, the flow conditioners 802A, 802B, and 802C may each include other flow conditioner elements, such as guide vanes and mixers. In other embodiments, the flow conditioner 802 may have four flow conditioners or more, arranged in series in the flow direction or in parallel.

In some embodiments, the electric field and length of each of the flow conditioners 802A, 802B, and 802C may be selected to ensure that the Nev of the flow conditioner is in the range of about 1000 to about 600000. In some embodiments, the electric field of each of the flow conditioners 802A, 802B, and 802C may be, for example, about 6 kilovolts/centimeter (kV/cm). In some embodiments, the characteristic mixing length $L_m$ of each of the flow conditioners 802A, 802B, and 802C may be 2 cm or less.

The separation apparatus 800 may be used in a horizontal orientation or a vertical orientation or in any intermediate inclination. The separation apparatus 800 may be used in a horizontal orientation or a vertical orientation. In embodiments in which the separation apparatus is installed in a vertical or inclined orientation, the flow through the separation apparatus 800 may be upward (that is, against gravity) or downward (that is, with gravity). In some embodiments, the separation apparatus 800 may be included in an inlet of a separator vessel, such as separator vessel in a crude oil processing facility. For example, the separation apparatus 800 may be integrated into an inlet of a high pressure production trap (HPPT), an inlet of a low pressure production trap (LPPT), or both. In some embodiments, the separation apparatus 800 may be additionally or alternatively be located between a high pressure production trap (HPPT) and a low pressure production trap (LPPT). In such embodiments, the separation apparatus 800 may enable the removal of water from crude oil before the crude oil is provided to a wet crude handling train of a crude oil processing facility. Advantageously, the use of the separation apparatus 800 in a crude oil processing facility may improve water separation, reduce the consumption of a demulsifier, reduce capital costs for additional water separation, and reduce heating requirements (for example, the crude oil may typically be heated to enhance separation using existing separation technologies).

In some embodiments, the separation apparatus 800 may be integrated into an inlet device, such as a multi-drum inlet device or a separator inlet device, such as be retrofitting the separation apparatus 800 to an existing inlet device. For example, the separation apparatus 800 may add electrocoalescence separation to existing inlet devices, including devices that already have a type of separation capability.

Figure 9:
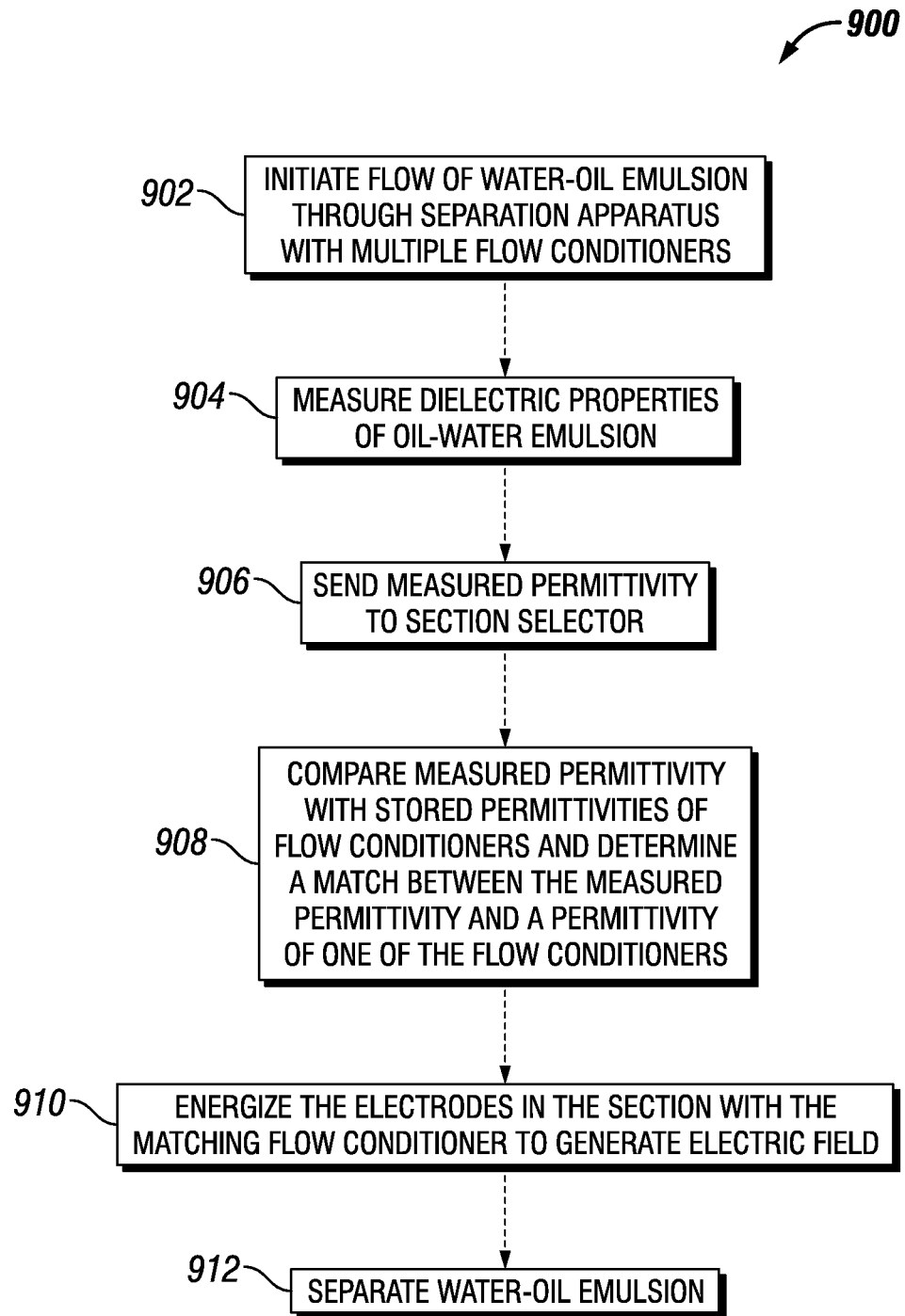
FIG. 9 is a block diagram of a process for operation of the separation apparatus depicted in FIG. 8 in accordance with an embodiment of the disclosure.

FIG. 9 depicts a process 900 for operation of the separation apparatus 800 depicted in FIG. 8 in accordance with an embodiment of the disclosure. Initially, the flow of a water-in-oil emulsion through the separation apparatus 800 may be initiated (block 902). For example, the water-in-oil emulsion may be produced crude oil from a well or multiple wells that is transported to a crude oil processing facility. The dielectric properties of the water-oil-emulsion in the measurement section may be measured (block 904).

The measured permittivity may be sent to the section selector 812 (block 906). The section selector 812 may compare the measured permittivity to stored permittivities associated with the flow conditioners in the separation apparatus and select the flow conditioner permittivity that is equal to or is as similar as possible to the measured permittivity of the water-in-oil emulsion. (block 908). For example, for an embodiment having three flow conditioners, the permittivity of one of the three flow conditioners that is as similar as possible to the measured permittivity may be selected. Next, the electrodes of the flow conditioner having the selected flow conditioner permittivity may be energized to generate an electric field (block 910), and the water-in-oil emulsion may be separated in the section having the electric field and selected flow conditioner (block 912).

Figure 10:
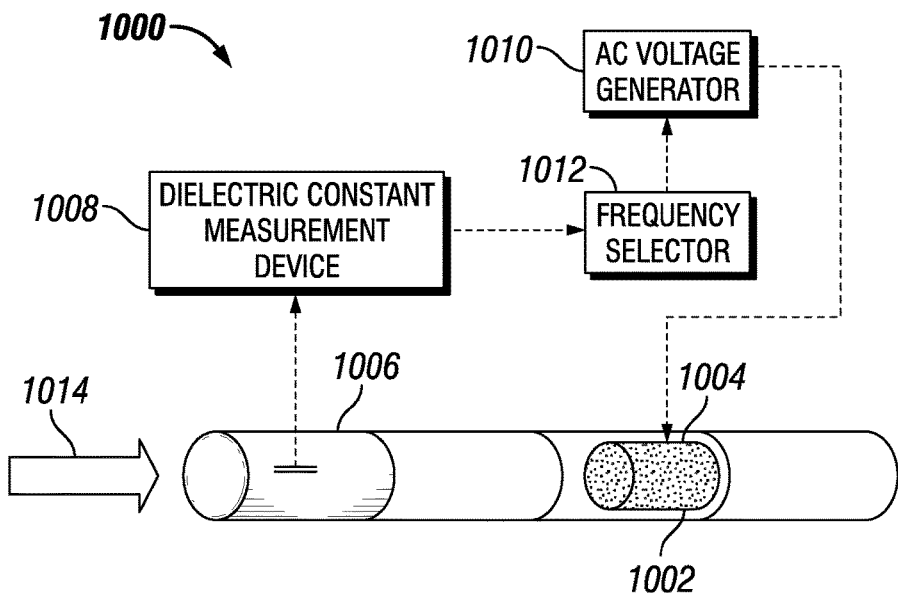
FIG. 10 is a schematic diagram of a separation apparatus having a flow conditioner with a frequency-dependent permittivity and disposed in section of the separation apparatus in accordance with an embodiment of the disclosure.

FIG. 10 depicts a separation apparatus 1000 having a flow conditioner 1002 constructed from a material having a frequency-dependent dielectric response (that is, frequency-dependent permittivity) and disposed in a section 1004 of the apparatus 1000 in accordance with an embodiment of the disclosure. The apparatus may include a measurement section 1006, a dielectric constant measurement device 1008, an AC voltage generator 1010, and a frequency selector 1012. In some embodiments, the sections of the separation apparatus 1000 may be generally cylindrical (for example, tubular) shaped. As described below, the separation apparatus 1000 may measure the dielectric constant of a flowing medium in the measurement section 1006 and select a frequency of the generated electric field in the section 1004 to match the frequency-dependent permittivity of the flow conditioner 1002 with the permittivity of flowing medium.

As shown by arrow 1014, a water-in-oil emulsion may enter the measurement section 1006 of the apparatus 1000. The dielectric constant measurement device 1008 may measure the dielectric properties of the flowing medium and transmit the permittivity to the frequency selector 1012. The section selector may be powered by the AC voltage generator 1010. In response to the permittivity of the flowing medium received from the dielectric constant measurement device 1008, the frequency selector 1012 may select an electric field frequency that causes the permittivity of the flow conditioner to be equal to or as similar as possible to the permittivity of the emulsion. The frequency selector 1012 then energizes the electrodes (via the AC voltage generator 1010) of the flow conditioner at the selected frequency.

The frequency selector 1012 may include logic to compare the measured permittivity to a range of permittivities achievable by the flow conditioner 1002. Each compare a received measured permittivity to a list of stored permittivities. In some embodiments, the frequency selector 1012 may include an application-specific integrated circuit (AISC) or a field-programmable gate array (FPGA). In some embodiments, the frequency selector 1012 may include a microprocessor, such as a reduced instruction set computing (RISC) processor or a complex instruction set computing (CISC) processor. The frequency selector 1012 may include volatile memory, such as random access memory (RAM), and non-volatile memory, such as ROM, flash memory, any other suitable optical, magnetic, or solid-state storage medium, or a combination thereof. The memory may store, for example, a range of permittivities each associated with a frequency (such as a list or other data structure) or an algorithm that enables calculation of the frequency from a permittivity.

In some embodiments, the flow conditioner 1002 may be constructed from a material having a dielectric permittivity that varies with frequency of the electric field. In some embodiments, the material may be a polymeric material having silica nanoparticles in an epoxy resin. As will be appreciated, materials having a dielectric permittivity that varies with frequency may be manufactured in the range of frequencies used in electrocoalescers for separation of oil-water mixtures. For example, the amplitude of the permittivity change and the frequency at which it occurs may be adjusted by the selection of the matrix and fillers with consideration of their respective dielectric permittivities and electrical conductivities.

In some embodiments, the electric field and length of the flow conditioner 1002 may be selected to ensure that the Nev of the flow conditioner is in the range of about 1000 to about 600000. In some embodiments, the electric field of the flow conditioner 1002 may be at most about 6 kilovolts/centimeter (kV/cm). In some embodiments, the characteristic mixing length $L_m$ of the flow conditioner 1002 may be 2 cm or less.

The flow conditioner 1002 may include a static mixer having a highly branched geometry or a helicoidal geometry. In some embodiments, the flow conditioner 1002 may be a straight pipe without a static mixer. In other embodiments, the flow conditioner 1002 may include other flow conditioner elements, such as guide vanes and mixers.

The separation apparatus 1000 may be used in a horizontal orientation or a vertical orientation or at any intermediate inclination. In embodiments in which the separation apparatus is installed in a vertical or inclined orientation, the flow through the separation apparatus 100 may be upward (that is, against gravity) or downward (that is, with gravity). In some embodiments, the separation apparatus 1000 may be included in an inlet of a separator vessel, such as separator vessel in a crude oil processing facility. For example, the separation apparatus 1000 may be integrated into an inlet of a high pressure production trap (HPPT), an inlet of a low pressure production trap (LPPT), or both. In some embodiments, the separation apparatus 1000 may be additionally or alternatively be located between a high pressure production trap (HPPT) and a low pressure production trap (LPPT). In such embodiments, the separation apparatus 1000 may enable the removal of water from crude oil before the crude oil is provided to a wet crude handling train of a crude oil processing facility. Advantageously, the use of the separation apparatus 1000 in a crude oil processing facility may improve water separation, reduce the consumption of a demulsifier, reduce capital costs for additional water separation, and reduce heating requirements (for example, the crude oil may typically be heated to enhance separation using existing separation technologies).

In some embodiments, the separation apparatus 1000 may be integrated into an inlet device, such as a multi-drum inlet device or a separator inlet device, such as be retrofitting the separation apparatus 1000 to an existing inlet device. For example, the separation apparatus 1000 may add electrocoalescence separation to existing inlet devices, including devices that already have a type of separation capability.

Figure 11:
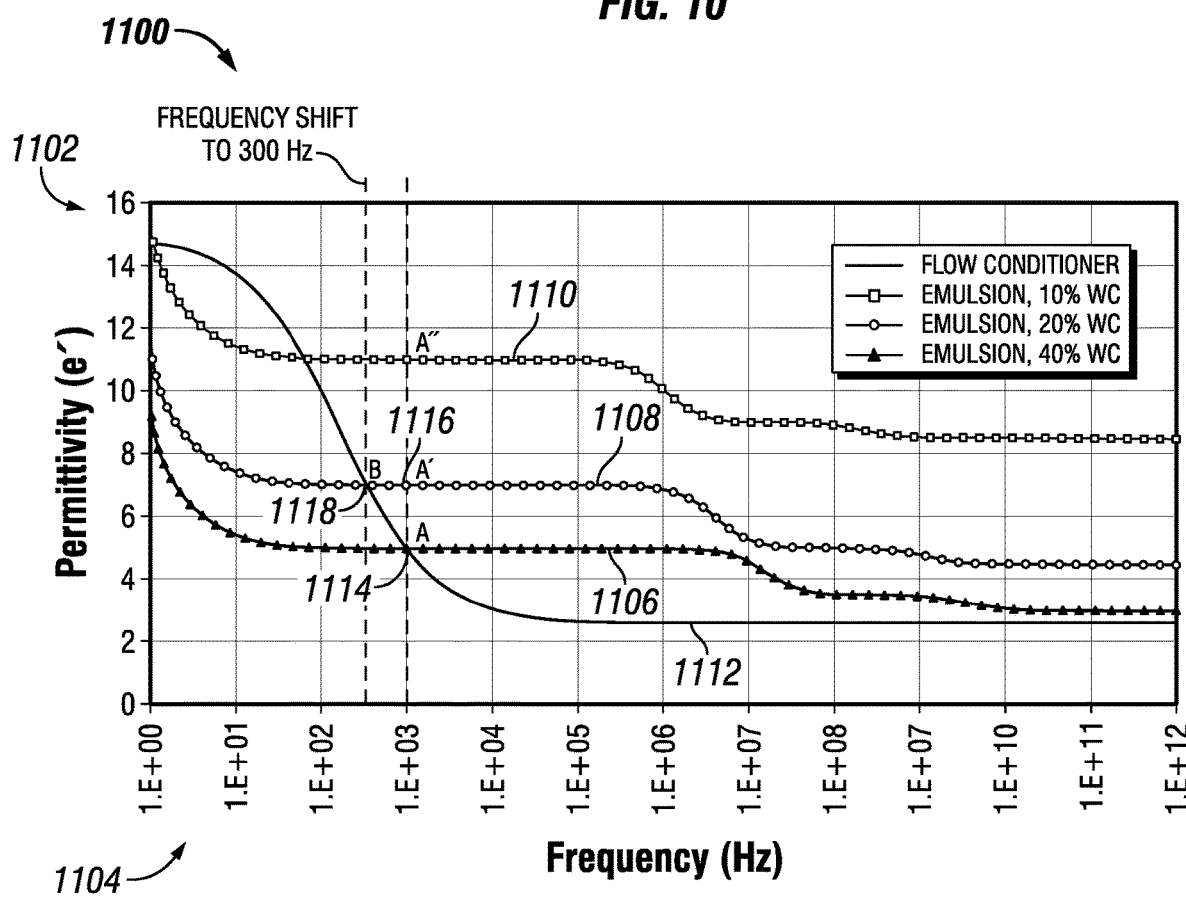
FIG. 11 is a graph of permittivity vs. frequency for a water-in-oil emulsion that depicts a frequency shift and its effect on permittivity in accordance with an embodiment of the disclosure.

FIG. 11 is a graph 1100 of permittivity vs. frequency for a water-in-oil emulsion that depicts a frequency shift and effect on permittivity in accordance with an embodiment of the disclosure. FIG. 11 reproduces the graph 700 shown in FIG. 7 and discussed above. As shown in FIG. 11, the y-axis 1102 depicts the permittivity value and the x-axis 1104 depicts the frequency in hertz (Hz). As also illustrated in FIG. 11, line 1106 depicts the permittivity of a water-in-oil emulsion having a 10% water cut, line 1108 depicts the permittivity of a water-in-oil emulsion having a 20% water cut, and line 1110 depicts the permittivity of a water-in-oil emulsion having a 40% water cut. FIG. 11 also depicts line 1112 corresponding to the permittivity of an example flow conditioner.

As shown in FIG. 11, after moving from the optimal condition depicted by point A (1114) to the point A' (1116), a frequency adjustment from kHz to 300 Hz would increase the permittivity of the flow conditioner (shown in line 1112) and move to the optimal condition shown by point B (1118).

Figure 12:
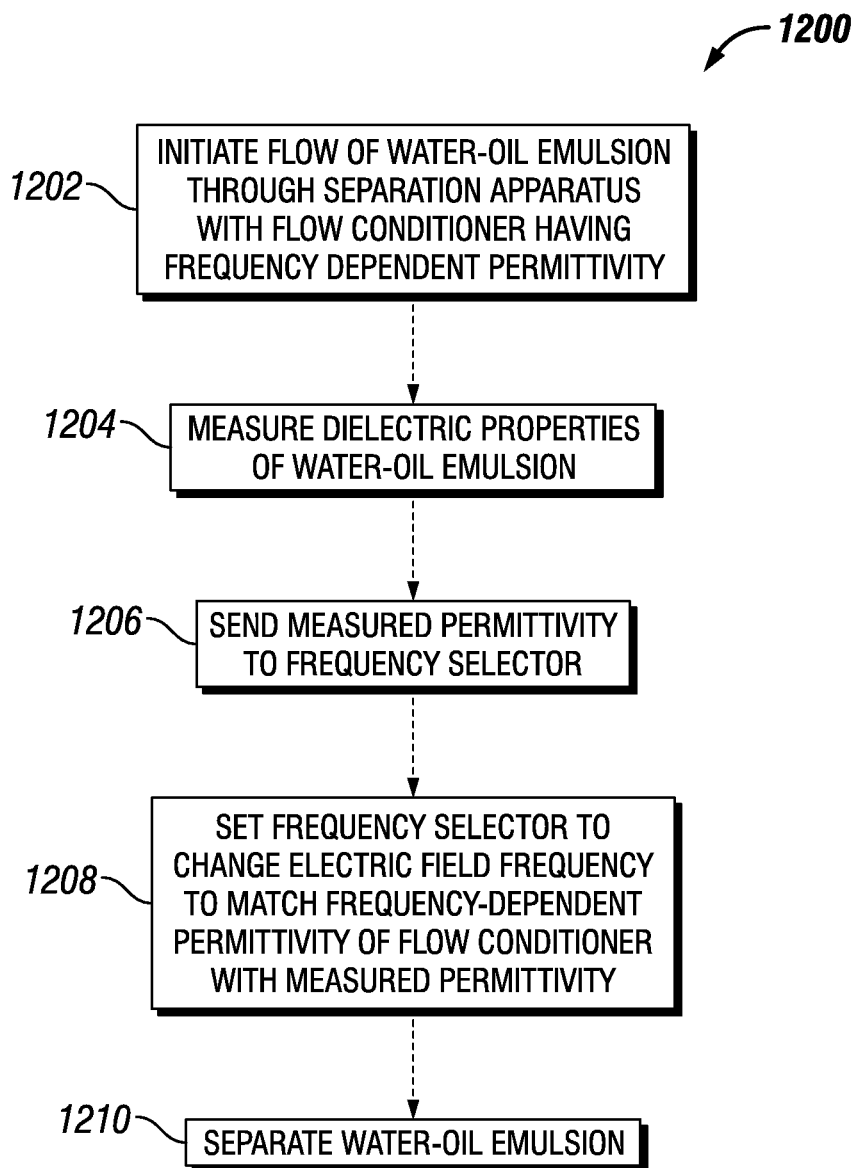
FIG. 12 is a block diagram of a process for operation of the separation apparatus depicted in FIG. 10 in accordance with an embodiment of the disclosure.

FIG. 12 depicts a process 1200 for operation of the separation apparatus 1000 depicted in FIG. 10 in accordance with an embodiment of the disclosure. Initially, the flow of a water-oil-emulsion through the separation apparatus 1000 may be initiated (block 1202). For example, the water-in-oil emulsion may be produced crude oil from a well or multiple wells that is transported to a crude oil processing facility. The dielectric properties of the water-oil-emulsion in the measurement section may be measured (block 1204).

The measured permittivity may be sent to the frequency selector 1012 (block 1206). Using the measured permittivity, the frequency selector 1012 may select a frequency of the electric field so that the frequency-dependent permittivity of the flow conditioner 1002 is equal to or as similar as possible to the measured permittivity. For example, in some embodiments, the frequency selector 1012 may compare the measured permittivity to a range of permittivities achievable by the flow conditioner 1002. Each permittivity in the range of permittivities may be associated with a frequency, such as via a stored list, an algorithm that enables calculation of the frequency from a permittivity, or other technique. Next, the frequency selector may change the electric field frequency of the flow conditioner to the selected frequency (that is, changing the frequency via the signal sent to the electrodes), such that the permittivity of the flow conditioner changes in response to the selected frequency to be equal to or as similar as possible to the permittivity of the emulsion (block 1208). The water-oil emulsion may be separated in the section having the electric field and flow conditioner with matching permittivity (block 1210).

Figure 13A:
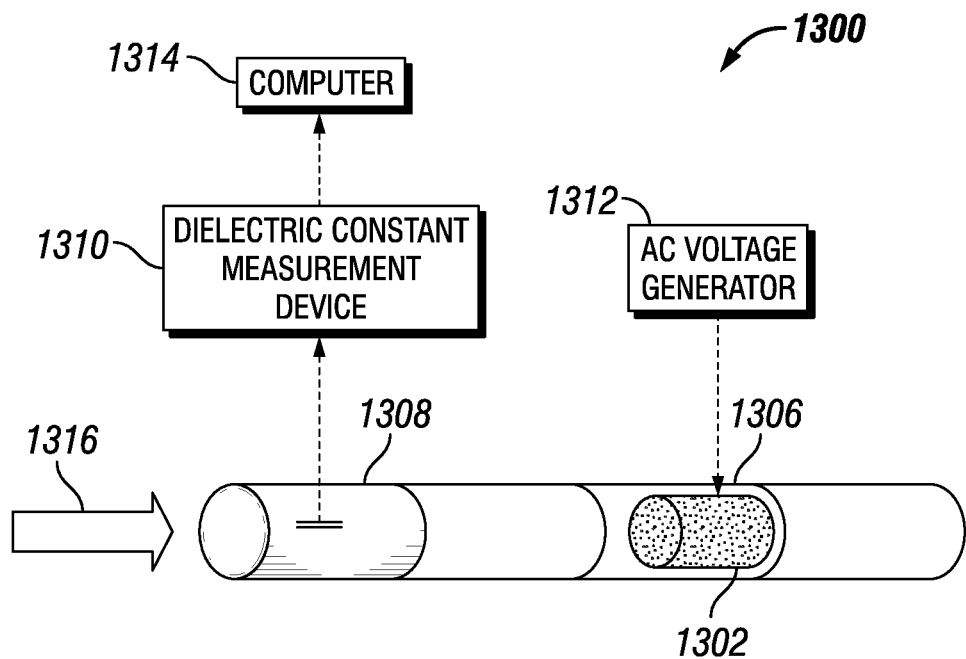
FIGS. 13A and 13B are schematic diagrams of a separation apparatus having replaceable flow conditioners with having different permittivities and disposed in section of the separation apparatus in accordance with an embodiment of the disclosure.
Figure 13B:
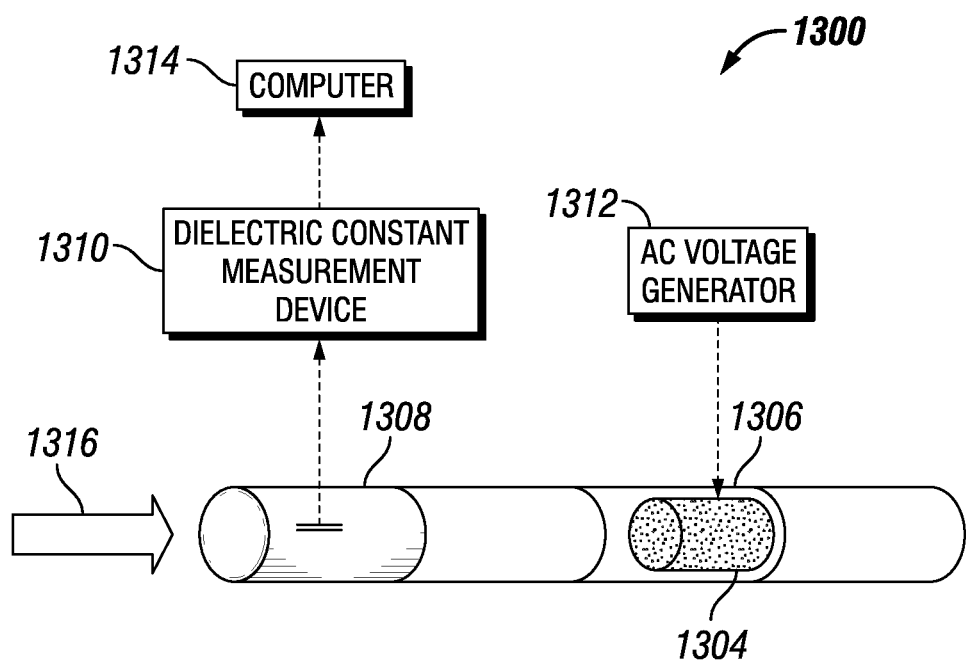

FIGS. 13A and 13B depict a separation apparatus 1300 having replaceable flow conditioners 1302 and 1304 constructed from different materials having different permittivities and disposed in a section 1306 of the apparatus 1300 in accordance with an embodiment of the disclosure. The apparatus may include a measurement section 1308, a dielectric constant measurement device 1310, and an AC voltage generator 1312. In some embodiments, the sections of the separation apparatus 1300 may be generally cylindrical (for example, tubular) shaped. In some embodiments, the dielectric constant measurement device 1310 may be coupled to a computer 1314. As described below, the separation apparatus 1300 may measure the dielectric constant of a flowing medium in the measurement section 1308 and provide an indication if the dielectric constant of the flowing medium differs by an unacceptable amount from the permittivity of the flow conditioner in the section 1306. In response, the flow conditioner (e.g., flow conditioner 1302) in the separation apparatus 1300 may be replaced with another flow conditioner (e.g., flow conditioner 1304). As will be appreciated, although the embodiment shown in FIGS. 13A and 13B depict two flow conditioners, other embodiments may use three, four, five or more flow conditioners that may each be removable and installable in the separation apparatus 1300.

As shown by arrow 1316, an emulsion may enter the measurement section 1308 of the apparatus 1300 having the flow conditioner 1302. The dielectric constant measurement device 1310 may measure the dielectric properties of the flowing medium and compare the permittivity of the flowing medium to the permittivity of the flow conditioner 1302. In response to the comparison, as shown in FIG. 13B, the flow conditioner 1302 may be replaced by the flow conditioner 1304 that more closely matches the permittivity of the flowing medium. In some embodiments, the section 1306 may include an access panel, a removable wall, or other feature that enables access to a flow conditioner disposed in the section. In this manner, the flow conditioner 1302 may be removed and the flow conditioner 1304 may be installed in the section 1306.

The flow conditioners 1302 and 1304, and other flow conditioners used in the separation apparatus 1300, may have different permittivities by using different dielectric materials to construct the flow conditioner. In some embodiments, a dielectric material of a given permittivity may be formed from the insertion of an inorganic filler into a polymeric matrix. In some embodiments, the inorganic filler may be $Al_2O_3$, $BaTiO_3$, $TiO_2$, or $ZrO_2$. As will be appreciated, the amount and type of inorganic filler to be added to the polymeric matrix may be adjusted to produce a material having the desired dielectric properties. Additionally, it should be appreciated that the polymeric matrix may be selected having relatively low water and crude oil uptake (as compared to other matrices) to minimize changes in the dielectric constant over time and when exposed to fluids. Table 8 described above provides examples of inorganic materials and polymers. For example, in some embodiments, the flow conditioners 1302 and 1304 may be constructed from $BaTiO_3$, $TiO_2$, or $ZrO_2$ in a polyimide matrix.

In other embodiments, the flow conditioners for use in the separation apparatus 1300 may be constructed using a ceramic material having closed cell porosity. For example, in some embodiments, the first flow conditioner 1302 may have a first inorganic filler in a first polymeric matrix, and the second flow conditioner 1304 may have a second inorganic filler in a second polymeric matrix. In some embodiments in which the flowing medium includes sand particles, flow conditioners construction using a ceramic material may be used to minimize erosion caused by the sand particles.

In some embodiments, the electric field and length of each of the flow conditioners 1302 and 1304 may be selected to ensure that the Nev of the flow conditioner is in the range of about 1000 to about 600000. In some embodiments, the electric field of each of the flow conditioners 1302 and 1304 may be at most about 6 kilovolts/centimeter (kV/cm). In some embodiments, the characteristic mixing length $L_m$ of each of the flow conditioners 1302 and 1304 may be 2 cm or less.

One or more of the flow conditioners 1302 and 1304 may each include a static mixer having a highly branched geometry or a helicoidal geometry. In some embodiments, one or more of the flow conditioners 1302 and 1304 may be a straight pipe without a static mixer. In some embodiments, the flow conditioners 1302 and 1304 may have different geometries. For example, the flow conditioners 1302 may have a static mixer with a highly branched geometry and the flow conditioner 1304 may have a static mixer with a helicoidal geometry. In other embodiments, the flow conditioners 1302 and 1304 may include other flow conditioner elements, such as guide vanes and mixers.

The separation apparatus 1300 may be used in a horizontal orientation or a vertical orientation or at any intermediate inclination. In some embodiments, the separation apparatus 1300 may be included in an inlet of a separator vessel, such as separator vessel in a crude oil processing facility. For example, the separation apparatus 1300 may be integrated into an inlet of a high pressure production trap (HPPT), an inlet of a low pressure production trap (LPPT), or both. In some embodiments, the separation apparatus 1300 may be additionally or alternatively be located between a high pressure production trap (HPPT) and a low pressure production trap (LPPT). In such embodiments, the separation apparatus 1300 may enable the removal of water from crude oil before the crude oil is provided to a wet crude handling train of a crude oil processing facility. Advantageously, the use of the separation apparatus 1300 in a crude oil processing facility may improve water separation, reduce the consumption of a demulsifier, reduce capital costs for additional water separation, and reduce heating requirements (for example, the crude oil may typically be heated to enhance separation using existing separation technologies).

In some embodiments, the separation apparatus 1300 may be integrated into an inlet device, such as a multi-drum inlet device or a separator inlet device, such as be retrofitting the separation apparatus 1300 to an existing inlet device. For example, the separation apparatus 1300 may add electrocoalescence separation to existing inlet devices, including devices that already have a type of separation capability.

Figure 14:
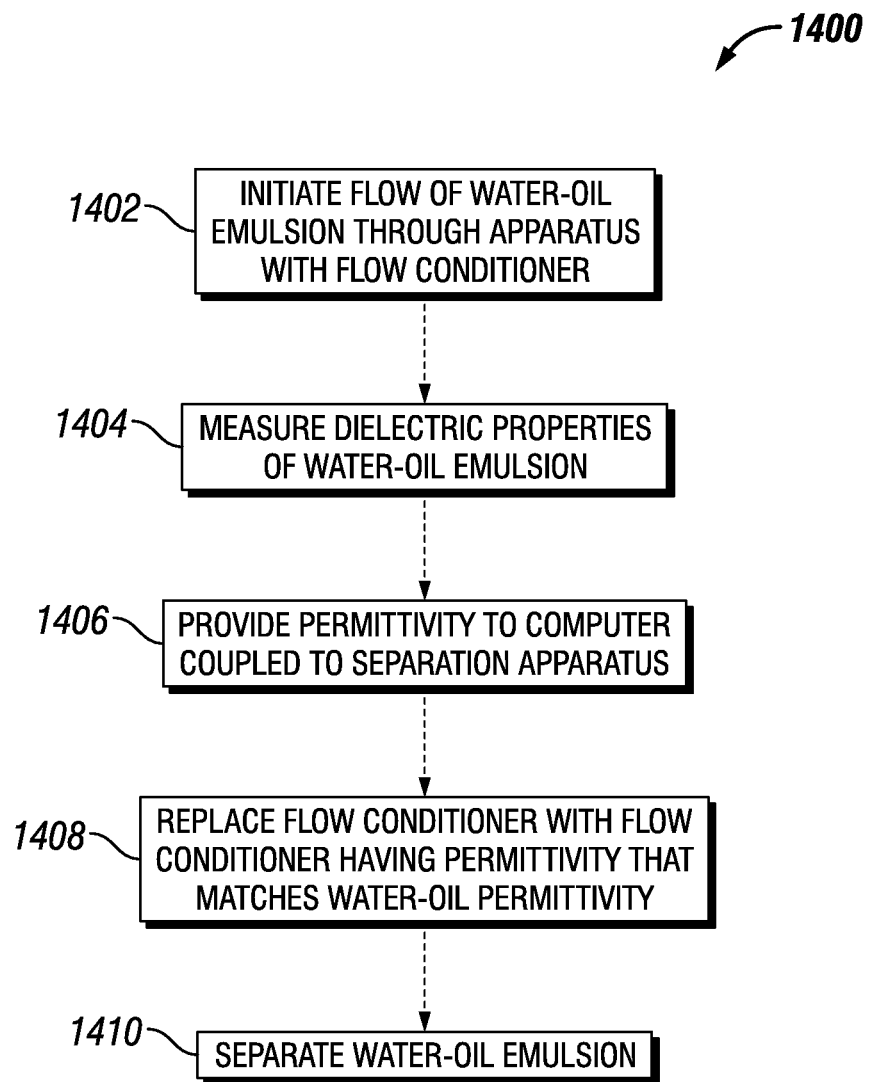
FIG. 14 is a block diagram of a process for operation of the separation apparatus depicted in FIGS. 13A and 13B in accordance with an embodiment of the disclosure.

FIG. 14 depicts a process 1400 for operation of the separation apparatus 1300 depicted in FIGS. 13A and 13B in accordance with an embodiment of the disclosure. Initially, the flow of a water-oil-emulsion through the separation apparatus 1300 may be initiated (block 1402). For example, the water-in-oil emulsion may be produced from crude oil from a well or multiple wells that is transported to a crude oil processing facility. The dielectric properties of the water-oil-emulsion in the measurement section may be measured (block 1404).

The measured permittivity may be provided, such as on a display of a computer coupled to the separation apparatus (block 1406). Based on the measured permittivity and the permittivity of the flow conditioner installed in the separation apparatus, the flow conditioner may be replaced with a flow conditioner having a permittivity that is equal to or as similar as possible to the measured permittivity of the emulsion (block 1408). After replacement, the electrodes of the flow conditioner may be energized and the water-in-oil emulsion may be separated in the section having the electric field and flow conditioner with equal or similar permittivity (block 1410).

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used or described in the disclosure are for organizational purposes only and are not meant to be used to limit the scope of the description.

What is claimed is:

1. A method of separating a mixture of two liquids, comprising:
   providing the mixture to a separation apparatus, the apparatus comprising:
   a permittivity measurement apparatus configured to measure the permittivity of the mixture;
   a flow conditioner section comprising an electrode for generating an electric field and a flow conditioner having a permittivity range, the permittivity range comprising a function of a frequency of the electric field; and
   a frequency selector configured to receive the mixture permittivity from the permittivity measurement apparatus and energize at least one first electrode of the flow conditioner section at a frequency;
   measuring the permittivity of the mixture;
   comparing the mixture permittivity to the permittivity range to make a comparison;
   energizing the electrode of the flow conditioner section at a selected frequency based on the comparison between the mixture permittivity and permittivity range; and
   directing the mixture through the electric field.

2. The method of claim 1, wherein the mixture is a water-in-oil emulsion.

3. The method of claim 1, wherein the flow conditioner comprises a helicoidal-shaped flow conditioner comprises a helicoidal flow path or a branched flow conditioner comprising a plurality of branched flow paths.

4. The method of claim 1, comprising transmitting the mixture permittivity to a frequency selector configured to receive the mixture permittivity from the permittivity measurement apparatus and energize the electrode of the flow conditioner section at the frequency.

* * * * *